United States Patent
Hsieh et al.

(10) Patent No.: US 11,469,815 B2
(45) Date of Patent: Oct. 11, 2022

(54) GROUP TIMING ADJUSTMENT FOR UPLINK TRANSMISSION AND COMMAND ACTIVATION IN NON-TERRESTRIAL NETWORKS

(71) Applicant: Nokia Technologies Oy, Espoo (FI)

(72) Inventors: Tzu-Chung Frank Hsieh, Hoffman Estates, IL (US); Ryan Keating, Chicago, IL (US)

(73) Assignee: Nokia Technolgies Oy, Espoo (FI)

( * ) Notice: Subject to any disclaimer, the term of this patent is extended or adjusted under 35 U.S.C. 154(b) by 0 days.

(21) Appl. No.: 17/185,324

(22) Filed: Feb. 25, 2021

(65) Prior Publication Data
US 2021/0297149 A1    Sep. 23, 2021

Related U.S. Application Data

(60) Provisional application No. 62/992,345, filed on Mar. 20, 2020.

(51) Int. Cl.
*H04B 7/185* (2006.01)
*H04W 76/11* (2018.01)
(Continued)

(52) U.S. Cl.
CPC ........... *H04B 7/18589* (2013.01); *H04B 7/01* (2013.01); *H04B 7/0626* (2013.01);
(Continued)

(58) Field of Classification Search
CPC .... H04B 7/18589; H04B 7/01; H04B 7/0626; H04W 56/005; H04W 64/00; H04W 72/0446

See application file for complete search history.

(56) References Cited

U.S. PATENT DOCUMENTS

2011/0138209 A1* 6/2011 Kim ................ H04W 52/0225
                                                         713/323
2012/0142391 A1* 6/2012 Kwon .................... H04W 4/08
                                                         455/519

(Continued)

FOREIGN PATENT DOCUMENTS

WO    2019/101063 A1    5/2019
WO    2020/034574 A1    2/2020

OTHER PUBLICATIONS

"Solutions for NR to Support Non-Terrestrial Networks (Ntn)", 3GPP TSG RAN meeting #86, RP-193234, Agenda : 9.1.2, Thales, Dec. 9-13, 2019, 10 pages.

(Continued)

*Primary Examiner* — Christine Ng
(74) *Attorney, Agent, or Firm* — Nokia Technologies Oy

(57) ABSTRACT

A system, apparatus, method, and non-transitory computer readable medium for accurately and efficiently determining communication offsets between at least one user equipment (UE) device and at least one non-terrestrial network (NTN) device may include a UE device including: a memory storing computer readable instructions and at least one processor configured to, determine location information of the UE device; receive group information from a NTN device, the group information including a plurality of group IDs corresponding to a plurality of group coverage areas within a beam coverage area, each of the plurality of group IDs including location information of a corresponding reference point, and group offset information associated with the corresponding reference point; select a group ID from the plurality of group IDs based on the location information of the UE device and the plurality of reference points; and perform UL transmission based on the group offset information.

20 Claims, 9 Drawing Sheets

(51) Int. Cl.
  *H04B 7/01*    (2006.01)
  *H04B 7/06*    (2006.01)
  *H04W 56/00*   (2009.01)
  *H04W 64/00*   (2009.01)
  *H04W 72/04*   (2009.01)
  *H04W 72/12*   (2009.01)
  *H04W 84/06*   (2009.01)

(52) U.S. Cl.
  CPC ....... *H04W 56/005* (2013.01); *H04W 64/006* (2013.01); *H04W 72/0446* (2013.01); *H04W 72/1268* (2013.01); *H04W 76/11* (2018.02); *H04W 84/06* (2013.01)

(56) References Cited

U.S. PATENT DOCUMENTS

| | | | | |
|---|---|---|---|---|
| 2018/0098199 | A1* | 4/2018 | Marshall | H04W 64/00 |
| 2019/0037387 | A1* | 1/2019 | Hua | H04W 40/02 |
| 2019/0313409 | A1* | 10/2019 | Tian | H04W 72/121 |
| 2021/0075501 | A1* | 3/2021 | Xu | H04B 7/18523 |

OTHER PUBLICATIONS

"3rd Generation Partnership Project; Technical Specification Group Radio Access Network; Solutions for NR to support non-terrestrial networks (NTN)(Release 16)", 3GPP Tr 38.821, V1 6.0.0, Dec. 2019, pp. 1-140.

"3rd Generation Partnership Project; Technical Specification Group Radio Access Network;NR; Physical layer procedures for data(Release 16)", 3GPP TS 38.214, V16.0.0, Dec. 2019, pp. 1-148.

"On Physical Layer Control Procedures for NTN", 3GPP TSG-RAN WG1 Meeting #98, R1-1909507, Agenda : 7.2.5.2, Ericsson, Aug. 26-30, 2019, pp. 1-13.

U.S. Appl. No. 62/888,305, "Sync Location for NTN Access", filed Aug. 16, 2019, 43 pages.

"3rd Generation Partnership Project; Technical Specification Group Radio Access Network; Study on New Radio (NR) to support non-terrestrial networks(Release 15)", 3GPP TR 38.811, V15.2.0, Sep. 2019, pp. 1-126.

Extended European Search Report received for corresponding European Patent Application No. 21158889.2, dated Sep. 2, 2021, 12 pages.

* cited by examiner

DL AND UL SLOT NUMBERS ALIGNED AT gNB gNB DL-UL FRAME TIMING SHIFT
DL AND UL SLOT NUMBERS UNALIGNED AT gNB

GROUP TIMING ADJUSTMENT FOR UPLINK TRANSMISSION AND COMMAND ACTIVATION IN NON-TERRESTRIAL NETWORKS

RELATED APPLICATION

This application claims priority to U.S. Provisional Application No. 62/992,345, filed on Mar. 20, 2020, which is incorporated herein by reference in its entirety.

BACKGROUND

Field

Various example embodiments relate to methods, apparatuses, systems, and/or non-transitory computer readable media for accurately and efficiently determining communication, transmission, and/or signaling offsets between at least one user equipment (UE) device and at least one non-terrestrial network (NTN) device based on the location information of the UE device.

Description of the Related Art

Currently, a $5^{th}$ generation mobile network (5G) standard, referred to as 5G New Radio (NR), is being developed to provide higher capacity, higher reliability, and lower latency communications than the 4G long term evolution (LTE) standard. Proposals for supporting the usage of non-terrestrial network (NTN) devices, such as satellites, unmanned aerial system (UAS) devices, etc., as radio access network (RAN) nodes, e.g., base stations, cells, etc., have been discussed. However, there are several technical challenges obstructing the use of NTN devices as RAN nodes in wireless communication systems. For example, there may be significantly large signal transmission propagation delays (e.g., round-trip transmission delays, etc.) between the NTN device and user equipment (UE) devices due to the large geographic distance between the NTN devices and the UE devices, with the signal transmission propagation delay spanning several scheduling slots, etc., and thereby causing inter-symbol interference of the uplink (UL) transmission. In the current 5G standard, a RAN node (e.g., a gNB node, a ng-eNB node, etc.) may correct timing errors in an UL signal from a UE device within a cyclic prefix (CP) length by using a timing advance (TA) value to align the UL transmission of UE devices within the RAN node's service area. However, the current 5G standard cannot support the large signal transmission propagation delays experienced by UL communications between NTN devices and UE devices because the TA value required to correct the timing error in the UL signal between the NTN device and the UE device is greater than the CP length.

Further, there may be differential transmission delays (e.g., a plurality of different round-trip transmission delay times) between various points in the transmission broadcast beam coverage area of the NTN device (e.g., beam area, broadcast area, transmission area, cell service area, etc.) due to the geographical size and/or breadth of the broadcast beam of the NTN device. In the current 5G standard, a common TA value is used to correct UL timing errors for all of the UE devices in a RAN node's service area. However, the use of a common TA value for all of the UE devices in a NTN device's beam coverage area will result in UL timing errors for some, or all, of the UE devices due to the differential transmission delays experienced at different locations of the NTN device's beam coverage area. Further, there may be significant changes in the signal propagation delays and/or a change in the frequency and wavelength of the signals transmitted between the NTN device and the UE device due to the motion of the NTN device and the Doppler effect seen in the transmitted signals.

Accordingly, an approach is desired that accurately and efficiently determines communication, transmission, and/or signaling offsets between at least one user equipment (UE) device and at least one non-terrestrial network (NTN) device based on location information of the UE device.

SUMMARY

At least one example embodiment relates to a user equipment (UE) device.

In at least one example embodiment, the UE device may include a memory storing computer readable instructions, and at least one processor configured to execute the computer readable instructions. The execution of the computer readable instructions by the at least one processor may cause the UE device to determine location information of the UE device; receive group information from a non-terrestrial network (NTN) device, the group information including a plurality of group identifiers (IDs) corresponding to a plurality of group coverage areas within a beam coverage area associated with the NTN device, each of the plurality of group IDs including location information of a corresponding reference point within the corresponding group coverage area and group offset information associated with the corresponding group coverage area; select a group ID from the plurality of group IDs based on the location information of the UE device and the location information of the plurality of reference points; and perform an uplink (UL) transmission with the NTN device based on the group offset information of the selected group ID.

Some example embodiments of the UE device provide that the group offset information of each of the group IDs includes at least one of: timing advance (TA) information associated with the corresponding reference point; at least one scheduling slot offset associated with the corresponding reference point; Doppler frequency shift offset information associated with the corresponding reference point; or any combinations thereof.

Some example embodiments of the UE device provide that the UE device is further caused to transmit the selected group ID to the NTN device; receive UL scheduling information from the NTN device based on the selected group ID; and perform the UL transmission based on the received UL scheduling information.

Some example embodiments of the UE device provide that the UE device is further caused to receive at least one command instruction from the NTN device; and perform at least one action based on the received at least one command instruction from the NTN device and the group offset information of the selected group ID.

Some example embodiments of the UE device provide that the performed at least one action includes at least one of: transmitting a channel state information (CSI) report based on the group offset information of the selected group ID; executing a medium access control (MAC) control element (CE) command from the NTN device based on the group offset information of the selected group ID; updating a beamforming weight for data reception based on the group offset information of the selected group ID; transmitting a sounding reference signal (SRS) based on the group offset information of the selected group ID; or any combinations thereof.

Some example embodiments of the UE device provide that the UE device is further caused to determine the location information of the UE device using at least one of a global navigation satellite system (GNSS), an inertial measurement sensor, a network location service response from a location server, or any combinations thereof.

Some example embodiments of the UE device provide that the UE device is further caused to receive a group ID re-selection instruction from the NTN device; determine updated location information of the UE device in response to the group ID re-selection instruction; select a new group ID from the plurality of group IDs based on the updated location information of the UE device and the location information of the plurality of reference points; and transmit the new group ID to the NTN device.

Some example embodiments of the UE device provide that the UE device is further caused to initiate a timer for a desired time period; determine updated location information of the UE device in response to the expiration of the desired time period; select a new group ID from the plurality of group IDs based on the updated location information of the UE device and the location information of the plurality of reference points; and transmit the new group ID to the NTN device.

Some example embodiments of the UE device provide that the UE device is further caused to determine updated location information of the UE device in response to detected movement of the UE device; determine whether the updated location information is out of a range associated with the selected group ID; select a new group ID from the plurality of group IDs based on the determined updated location information of the UE device and the location information of the plurality of reference points in response to the updated location information being out of the range associated with the selected group ID; and transmit the new group ID to the NTN device.

Some example embodiments of the UE device provide that the NTN device is at least one of a Geostationary Earth Orbiting (GEO) satellite, a Medium Earth Orbiting (MEO) satellite, a Low Earth Orbiting (LEO) satellite, an Unmanned Aerial System (UAS) vehicle, a High Altitude Platform Station (HAPS) vehicle, a manned aerial vehicle (MAV) device, or any combinations thereof.

At least one example embodiment relates to a non-terrestrial network (NTN) device.

In at least one example embodiment, the NTN device may include at least one wireless transmitter configured to communicate with at least one user equipment (UE) device located within a beam coverage area of the NTN device, the beam coverage area including a plurality of group coverage areas, each of the plurality of group coverage areas including a reference point, a memory storing computer readable instructions, and at least one processor configured to execute the computer readable instructions. The execution of the computer readable instructions by the at least one processor may cause the NTN device to determine group offset information for each of the plurality of group coverage areas based on a distance between the NTN device and a location of the reference point corresponding to the group coverage area; transmit group information to the at least one UE device, the group information including a plurality of group identifiers (IDs) corresponding to the plurality of group coverage areas, each of the plurality of group IDs including location information of the corresponding reference point of the group coverage area, and group offset information associated with the corresponding group coverage area; receive a message from the at least one UE device indicating a group ID selected from the plurality of group IDs, the selected group ID being selected based on a location of the at least one UE device and the location information of the plurality of reference points; and communicate with the at least one UE device based on the group offset information of the selected group ID.

Some example embodiments of the NTN device provide that the NTN device is further caused to determine the group offset information for each of the plurality of reference points by calculating at least one of: Timing Advance (TA) offset information associated with the corresponding reference point; at least one scheduling slot offset associated with the corresponding reference point; Doppler frequency shift offset information associated with the corresponding reference point; or any combinations thereof.

Some example embodiments of the NTN device provide that the NTN device is further caused to determine uplink (UL) scheduling information for the at least one UE device based on the selected group ID; transmit the determined UL scheduling information to the at least one UE device; and receive an UL transmission from the at least one UE device based on the determined UL scheduling information.

Some example embodiments of the NTN device provide that the NTN device is further caused to transmit at least one command instruction to the UE device, wherein the transmitted at least one command instruction causes the UE device to perform at least one action based on the command instructions from the NTN device and the group offset information of the selected group ID.

Some example embodiments of the NTN device provide that the NTN device is further caused to receive a channel state information (CSI) report based on the group offset information of the selected group ID; transmit a medium access control (MAC) control element (CE) command from the NTN device based on the group offset information of the selected group ID; select a beamforming weight for data transmission based on the group offset information of the selected group ID; receive a sounding reference signal (SRS) based on the group offset information of the selected group ID; or any combinations thereof.

Some example embodiments of the NTN device provide that the NTN device may further include a non-terrestrial wireless transmission platform including the at least one wireless transmitter, wherein the non-terrestrial wireless transmission platform includes at least one of a Geostationary Earth Orbiting (GEO) satellite, a Medium Earth Orbiting (MEO) satellite, a Low Earth Orbiting (LEO) satellite, an Unmanned Aerial System (UAS) vehicle, a High Altitude Platform Station (HAPS) vehicle, a manned aerial vehicle (MAV) device, or any combinations thereof.

Some example embodiments of the NTN device provide that the NTN device may further include a core network gateway configured to communicate with the non-terrestrial wireless transmission platform, the core network gateway connected to at least one data network, wherein the non-terrestrial wireless transmission platform and the core network gateway operate as a radio access network (RAN) node.

Some example embodiments of the NTN device provide that the NTN device is further caused to receive an UL transmission from the at least one UE device; calculate a UL timing error in the received UL transmission based on the selected group ID; transmit a group ID re-selection instruction to the at least one UE device based on the calculated UL timing error; and receive a group ID re-selection message from the at least one UE device in response to the transmitted group ID re-selection instruction, the group ID re-selection message including a new group ID selected based on an updated location of the UE device.

Some example embodiments of the NTN device provide that the NTN device is further caused to periodically transmit a System Information Block (SIB) message to the beam coverage area, the SIB message including the plurality of group IDs, and the corresponding group offset information.

At least one example embodiment relates to method of operating a user equipment (UE) device.

In at least one example embodiment, the method may include: determining, using at least one processor, location information of the UE device; receiving, using the at least one processor, group information from a non-terrestrial network (NTN) device, the group information including a plurality of group identifiers (IDs) corresponding to a plurality group coverage areas within a beam coverage area associated with the NTN device, each of the plurality of group IDs including location information of a corresponding reference point within the corresponding group coverage area, and group offset information associated with the corresponding group coverage area; selecting, using at least one processor, a group ID from the plurality of group IDs based on the location information of the UE device and the location information of the plurality of reference points; and performing, using the at least one processor, an uplink (UL) transmission with the NTN device based on the group offset information of the selected group ID.

At least one example embodiment relates to a user equipment (UE) device.

In at least one example embodiment, the UE device may include means for determining location information of the UE device; receiving group information from a non-terrestrial network (NTN) device, the group information including a plurality of group identifiers (IDs) corresponding to a plurality of group coverage areas within a beam coverage area associated with the NTN device, each of the plurality of group IDs including location information of a corresponding reference point within the corresponding group coverage area and group offset information associated with the corresponding group coverage area; select a group ID from the plurality of group IDs based on the location information of the UE device and the location information of the plurality of reference points; and performing an uplink (UL) transmission with the NTN device based on the group offset information of the selected group ID.

Some example embodiments of the UE device provide that the group offset information of each of the group IDs includes at least one of: timing advance (TA) information associated with the corresponding reference point; at least one scheduling slot offset associated with the corresponding reference point; Doppler frequency shift offset information associated with the corresponding reference point; or any combinations thereof.

Some example embodiments of the UE device provide that the UE device further includes means for transmitting the selected group ID to the NTN device; receiving UL scheduling information from the NTN device based on the selected group ID; and performing the UL transmission based on the received UL scheduling information.

Some example embodiments of the UE device provide that the UE device further includes means for receiving at least one command instruction from the NTN device; and performing at least one action based on the received at least one command instruction from the NTN device and the group offset information of the selected group ID.

Some example embodiments of the UE device provide that the performed at least one action includes at least one of: transmitting a channel state information (CSI) report based on the group offset information of the selected group ID; executing a medium access control (MAC) control element (CE) command from the NTN device based on the group offset information of the selected group ID; updating a beamforming weight for data reception based on the group offset information of the selected group ID; transmitting a sounding reference signal (SRS) based on the group offset information of the selected group ID; or any combinations thereof.

Some example embodiments of the UE device provide that the UE device further includes means for determining the location information of the UE device using at least one of a global navigation satellite system (GNSS), an inertial measurement sensor, a network location service response from a location server, or any combinations thereof.

Some example embodiments of the UE device provide that the UE device further includes means for receiving a group ID re-selection instruction from the NTN device; determining updated location information of the UE device in response to the group ID re-selection instruction; selecting a new group ID from the plurality of group IDs based on the updated location information of the UE device and the location information of the plurality of reference points; and transmitting the new group ID to the NTN device.

Some example embodiments of the UE device provide that the UE device further includes means for initiating a timer for a desired time period; determine updated location information of the UE device in response to the expiration of the desired time period; selecting a new group ID from the plurality of group IDs based on the updated location information of the UE device and the location information of the plurality of reference points; and transmitting the new group ID to the NTN device.

Some example embodiments of the UE device provide that the UE device further includes means for determining updated location information of the UE device in response to detected movement of the UE device; determining whether the updated location information is out of a range associated with the selected group ID; selecting a new group ID from the plurality of group IDs based on the determined updated location information of the UE device and the location information of the plurality of reference points in response to the updated location information being out of the range associated with the selected group ID; and transmitting the new group ID to the NTN device.

Some example embodiments of the UE device provide that the NTN device is at least one of a Geostationary Earth Orbiting (GEO) satellite, a Medium Earth Orbiting (MEO) satellite, a Low Earth Orbiting (LEO) satellite, an Unmanned Aerial System (UAS) vehicle, a High Altitude Platform Station (HAPS) vehicle, a manned aerial vehicle (MAV) device, or any combinations thereof.

At least one example embodiment relates to a non-terrestrial network (NTN) device.

In at least one example embodiment, the NTN device may include means for communicating with at least one user equipment (UE) device located within a beam coverage area of the NTN device, the beam coverage area including a plurality of group coverage areas, each of the plurality of group coverage areas including a reference point, a memory storing computer readable instructions; determining group offset information for each of the plurality of group coverage areas based on a distance between the NTN device and a location of the reference point corresponding to the group coverage area; transmitting group information to the at least one UE device, the group information including a plurality of group identifiers (IDs) corresponding to the plurality of group coverage areas, each of the plurality of group IDs including location information of the corresponding reference point of the group coverage area, and group offset information associated with the corresponding group coverage area; receiving a message from the at least one UE device indicating a group ID selected from the plurality of group IDs, the selected group ID being selected based on a location of the at least one UE device and the location information of the plurality of reference points; and communicating with the at least one UE device based on the group offset information of the selected group ID.

Some example embodiments of the NTN device provide that the NTN device further includes means for determining the group offset information for each of the plurality of reference points by calculating at least one of: Timing Advance (TA) offset information associated with the corresponding reference point; at least one scheduling slot offset associated with the corresponding reference point; Doppler frequency shift offset information associated with the corresponding reference point; or any combinations thereof.

Some example embodiments of the NTN device provide that the NTN device further includes means for determining uplink (UL) scheduling information for the at least one UE device based on the selected group ID; transmitting the determined UL scheduling information to the at least one UE device; and receiving an UL transmission from the at least one UE device based on the determined UL scheduling information.

Some example embodiments of the NTN device provide that the NTN device further includes means for transmitting at least one command instruction to the UE device, wherein the transmitted at least one command instruction causes the UE device to perform at least one action based on the command instructions from the NTN device and the group offset information of the selected group ID.

Some example embodiments of the NTN device provide that the NTN device further includes means for receiving a channel state information (CSI) report based on the group offset information of the selected group ID; transmitting a medium access control (MAC) control element (CE) command from the NTN device based on the group offset information of the selected group ID; selecting a beamforming weight for data transmission based on the group offset information of the selected group ID; receiving a sounding reference signal (SRS) based on the group offset information of the selected group ID; or any combinations thereof.

Some example embodiments of the NTN device provide that the NTN device may further include a non-terrestrial wireless transmission platform including the at least one wireless transmitter, wherein the non-terrestrial wireless transmission platform includes at least one of a Geostationary Earth Orbiting (GEO) satellite, a Medium Earth Orbiting (MEO) satellite, a Low Earth Orbiting (LEO) satellite, an Unmanned Aerial System (UAS) vehicle, a High Altitude Platform Station (HAPS) vehicle, a manned aerial vehicle (MAV) device, or any combinations thereof.

Some example embodiments of the NTN device provide that the NTN device may further include a core network gateway including means for communicating with the non-terrestrial wireless transmission platform, the core network gateway connected to at least one data network, wherein the non-terrestrial wireless transmission platform and the core network gateway operate as a radio access network (RAN) node.

Some example embodiments of the NTN device provide that the NTN device further includes means for receiving an UL transmission from the at least one UE device; calculating a UL timing error in the received UL transmission based on the selected group ID; transmitting a group ID re-selection instruction to the at least one UE device based on the calculated UL timing error; and receiving a group ID re-selection message from the at least one UE device in response to the transmitted group ID re-selection instruction, the group ID re-selection message including a new group ID selected based on an updated location of the UE device.

Some example embodiments of the NTN device provide that the NTN device further includes means for periodically transmitting a System Information Block (SIB) message to the beam coverage area, the SIB message including the plurality of group IDs, and the corresponding group offset information.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
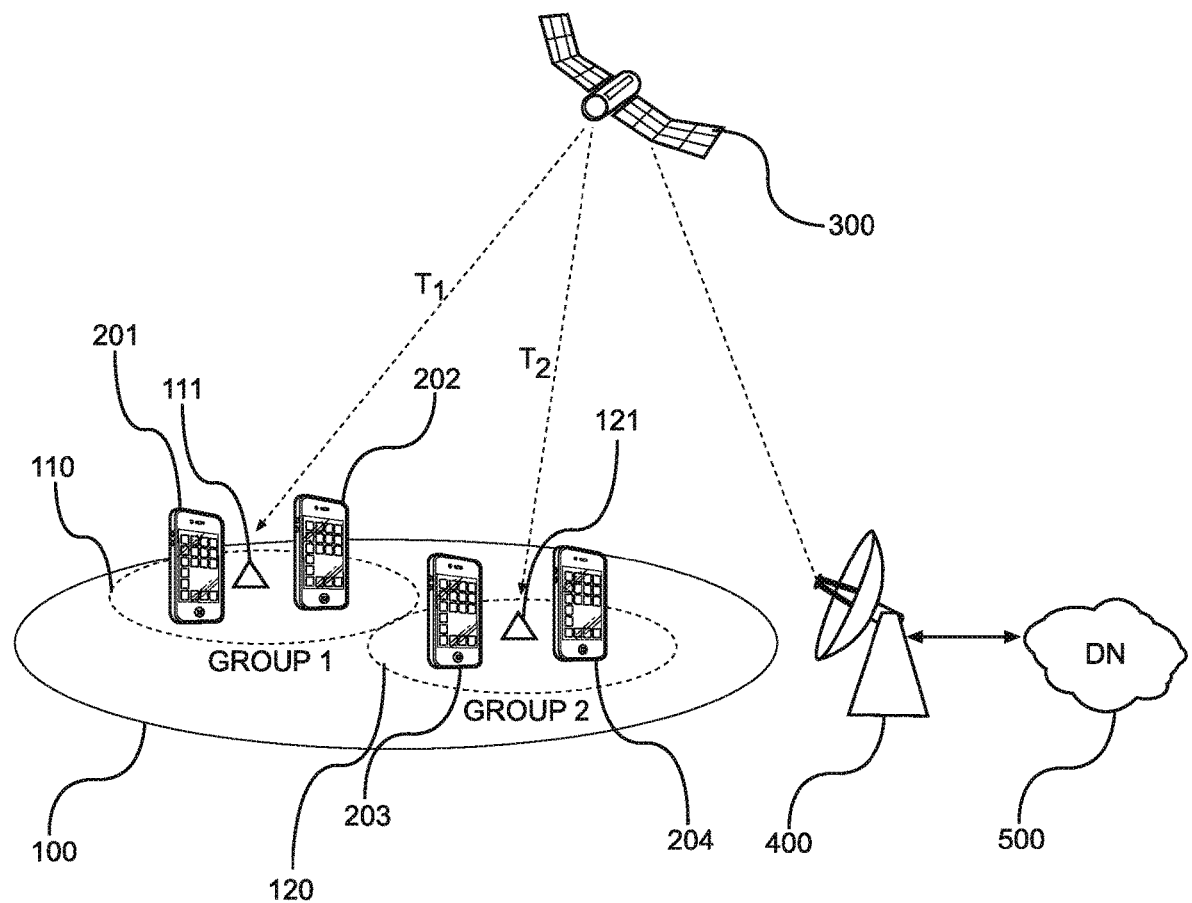
FIG. 1 illustrates a wireless NTN communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the disclosure. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to a wireless non-terrestrial network (NTN) system capable of accurately and efficiently determining communication, transmission, and/or signaling offsets between at least one user equipment (UE) device and at least one NTN device based on the location information of the UE device. While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G wireless protocol, a future 6G wireless protocol, a future 7G wireless protocol, a Wi-Fi system, etc.

FIG. 1 illustrates a wireless NTN communication system according to at least one example embodiment. As shown in FIG. 1, a wireless NTN communication system includes a plurality of user equipment (UE) devices (UEs or UE devices), such as UEs 201, 202, 203, and 204, etc., at least one NTN device 300, a core network gateway 400, and a Data Network 500, but the example embodiments are not limited thereto and the example embodiments may include a greater or lesser number of constituent elements. For example, the wireless NTN communication system may include one or more UE devices, one or more NTN devices, one or more core network gateways, etc.

The UEs 201, 202, 203, and/or 204, the NTN device 300, and/or the core network gateway 400 may be connected over a wireless network, such as a wireless radio access network (e.g., a 3G wireless access network, a 4G-Long Term Evolution (LTE) network, a 5G-New Radio (e.g., 5G) wireless network, a 6G wireless network, a 7G wireless network, etc.). The core network gateway 400 and the Data Network 500 may connect to each other over a wired and/or wireless network.

The UEs 201, 202, 203, and/or 204 may be any one of, but not limited to, a mobile device, a tablet, a laptop computer, a wearable device, an Internet of Things (IoT) device, a desktop computer and/or any other type of stationary or portable device capable of operating according to the 5G NR communication standard, and/or other wireless communication standard.

The wireless NTN communication system further includes at least one NTN device 300, but is not limited thereto. The NTN device 300 may be a low earth orbiting (LEO) satellite, a medium earth orbiting (MEO) satellite, a geostationary earth orbiting (GEO) satellite, a UAS device (e.g., a drone, a blimp, a balloon, etc.), a high altitude platform station (HAPS) vehicle, a manned aerial vehicle (MAV) device, etc. Further, there may be a plurality of NTN devices that act as a constellation of NTN devices, providing a coordinated coverage area among the plurality of NTN devices, e.g., a constellation of satellites, a constellation of UASs, and/or a constellation of satellites and UASs, etc. The NTN device 300 may operate as a RAN node according to an underlying cellular and/or wireless network communications protocol, such as the 5G NR LTE communication protocol, etc. For example, the NTN device 300 may operate as a 5G gNB node or an LTE ng-eNB node, etc., but the example embodiments are not limited thereto. According to some example embodiments, when the NTN device 300 operates as the RAN node (e.g., operates as a "regenerative" NTN device, etc.), the NTN device 300 will digitally process wireless communication signals (e.g., 5G NR signals, etc.) and is the wireless communication signal transmission and reception point. According to some example embodiments, the NTN device 300 may contain some or all of the components of a gNB node or a ng-eNB node, etc., such as a distributed unit (DU) and/or a central unit (CU), etc.

Additionally, in some example embodiments, the NTN device 300 may operate as a RAN node in combination with the core network gateway 400 (e.g., the RAN node is co-located in the NTN device 300 and the core network gateway 400), with the NTN device 300 operating as a repeater or a "transparent" satellite, and performing frequency conversion and amplification of the wireless communication signal (e.g., 5G NR signal, etc.) transmitted from the core network gateway 400. Also, the core network gateway 400 may in turn be connected to a Data Network 500 (e.g., the Internet, an intranet, a wide area network, etc.) and/or core network elements, such as servers, access points, switches, routers, nodes, etc. According to some example embodiments, a RAN node, such as a gNB node, etc., may have a split architecture where, for example, the distributed unit (DU) and the central unit (CU) are not collocated, and instead, the components of the RAN node may be deployed in separate locations. For example, in the example of a gNB node, the DU may be onboard the NTN device 300, and the CU is located at the core network gateway 400, but the example embodiments are not limited thereto.

Moreover, the components of the RAN node, such as the DU and the CU, etc., may be logical units, and each may perform various RAN node functions based on the wireless communication protocol. For example, if the NTN device 300 is configured as a gNB node, the 5G NR network functions allocated to the gNB node may be split between the DU and the CU. In this example, the CU may include the mobility control, radio access network sharing (RANS), positioning, session management function (SMF), etc., network functions, and the DU may include the packet data convergence protocol (PDCP), radio link control (RLC), medium access control (MAC), Physical Layer, radio frequency (RF), etc., network functions, but the example embodiments are not limited thereto.

In either the "regenerative" or "transparent" configuration, the wireless connection between the NTN device 300 and the core network gateway 400 may be referred to as a "feeder link," and the wireless connection between the NTN device 300 and the plurality of UE devices 201, 202, 203, and/or 204 may be referred to as service links. The NTN device 300 may emit a radio signal to a desired geographical location on Earth, such as beam coverage area 100 (e.g., beam footprint, NTN device cell, NTN device service area, broadcast area, etc.). The terrestrial location covered by the NTN device 300's beam coverage area 100 may be based on the position of the NTN device 300 in relation to the Earth, the beam direction, settings of the NTN device 300's beam emitter, and/or the movement (if any) of the NTN device 300 in relation to the Earth, etc. Additionally, the position of the beam coverage 100 may be static (e.g., fixed, stationary, etc.) or transitory (e.g., moving, etc.), or a combination of static and transitory, but the example embodiments are not limited thereto. The size of the beam coverage area 100 may vary, and for example, the diameter of the beam coverage area 100 may range from 500 km to 1000 km for a GEO satellite, or 100 km to 200 km for a LEO satellite, etc., but the example embodiments are not limited thereto.

Further, due to the distance of the NTN device 300 from the surface of the Earth (and the location of the UE devices 201, 202, 203, and/or 204, etc.), the signal propagation delay (e.g., the round-trip time taken for a beam to be transmitted to and from the surface of the Earth, etc.) between the NTN device 300 and the UE devices 201, 202, 203, and/or 204 may be significantly higher (e.g., several orders of magnitude higher) than the signal propagation delay between a terrestrial RAN node (e.g., a cellular network cell tower, etc.) and a UE device. Table 1 illustrates example signal propagation delays (e.g., round-trip delays) between several example NTN device deployments and a typical terrestrial cellular RAN node.

TABLE 1

|  | Transparent satellite | Regenerative satellite |
| --- | --- | --- |
| GEO (35,786 km) | 541.46 ms | 270.73 ms |
| LEO (600 km) | 25.77 ms | 12.89 ms |
| LEO (1200 km) | 41.77 ms | 20.89 ms |
| Typical cellular (500 m ISD) | 1.92 µs | |

As can be seen in Table 1, a representative GEO satellite may experience round-trip signal times of approximately 270.73 ms to approximately 541.46 ms, whereas a typical terrestrial RAN node may experience a round-trip signal time of approximately 1.92 µs.

Additionally, due to the fact that the size of a beam coverage area 100 (e.g., ~100 km to ~1000 km, etc.) may be much larger than the size of a terrestrial RAN node, there may be differences in the signal propagation delay between different locations within the beam coverage area 100. These differences in the signal propagation delays between different locations within the beam coverage area 100 may be significantly large and may result in timing differences between UEs located in different locations within the same beam coverage area that are greater than a single scheduling slot.

Consequently, according to at least one example embodiment, a beam coverage area 100 may be divided into (e.g., allocated, assigned, determined, calculated, etc.) one or more groups, such as group 110 and group 120 of FIG. 1, etc., but the example embodiments are not limited thereto. The groups 110 and 120 of the beam coverage area 100 may be assigned a unique group identifier (e.g., "Group 1", "Group 2", etc.) that corresponds to a reference point (e.g., a centroid location, etc.) associated with and/or corresponding to the desired coverage area of the group. Further, the NTN device 300 may calculate group information for each group of the beam coverage area 100, such as timing advance information, slot offset information (e.g., scheduling slot offset information, etc.), Doppler frequency shift offset information, etc. The division of the beam coverage area into groups, and the calculation of the group information will be discussed in further detail in connection with FIG. 3B.

The NTN device 300 then periodically broadcasts the group information to every group of the beam coverage area 100, and any UE devices located within the beam coverage area may receive the broadcast group information from the NTN device 300. Additionally, according to at least one example embodiment, the NTN device 300 may calculate and broadcast the group information upon changes in the group information and/or the changes in the beam coverage area (e.g., the beam coverage area has moved, etc.), or based on a hand-over of the beam coverage area to another NTN device, such as another NTN device within the same NTN constellation as the NTN device 300.

Each UE device, for example, UE device 201, may determine their current location information using, for example, a global navigation satellite system (GNSS) (e.g., GPS, GLONASS, Galileo, Beidou, etc.), a cellular network location request/response (e.g., transmitting a location request to a location management function (LMF) service of the core network, an Assisted-GPS function, etc.), and/or other location determining methods. In some example embodiments, the LMF may also be a local location management component (LMC), which is part of the RAN node, but the example embodiments are not limited thereto. The UE device 201 may select one of the groups of the beam coverage area 100 to use in the UE device 201's communication transmission to the core network via the NTN device 300 based on the current location information and the broadcast group information from the NTN device 300, and more specifically using the timing advance information, slot offset information, and/or Doppler frequency shift offset information, etc., included in the group information associated with the selected group. These concepts will be described in further detail in connection with FIGS. 3A to 3E.

While certain components of the cellular wireless network are shown as part of the wireless NTN communication system of FIG. 1, the example embodiments are not limited thereto, and the cellar wireless network may include components other than that shown in FIG. 1, which are desired, necessary, and/or beneficial for operation of the underlying networks within the wireless NTN communication system, such as access points, switches, routers, nodes, servers, etc.

Figure 2A:
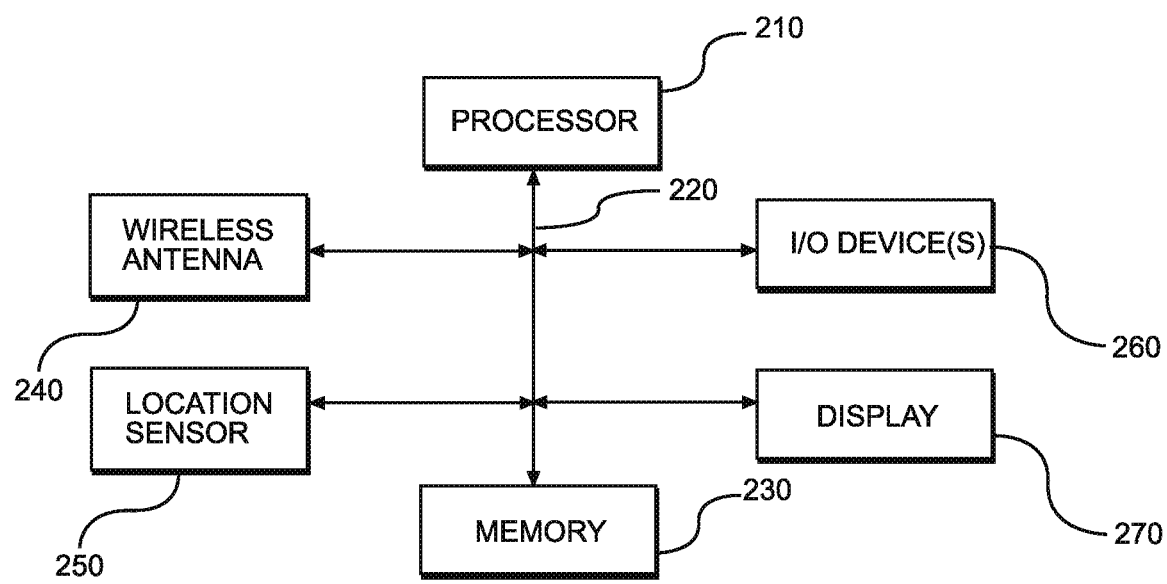
FIG. 2A illustrates a block diagram of an example UE device according to at least one example embodiment.

FIG. 2A illustrates a block diagram of an example UE device according to at least one example embodiment. The UE device of FIG. 2A may be any one of the UE devices 201, 202, 203, and/or 204, etc., of FIG. 1, but the example embodiments are not limited thereto Referring to FIG. 2A, a UE 201 may include processing circuitry, such as the at least one processor 210, a communication bus 220, a memory 230, at least one wireless antenna 240, at least one location sensor 250, at least one input/output (I/O) device 260 (e.g., a keyboard, a touchscreen, a mouse, a microphone, a camera, a speaker, etc.), and/or a display panel 270 (e.g., a monitor, a touchscreen, etc.), but the example embodiments are not limited thereto. The memory 230 may include various program code including computer executable instructions.

In at least one example embodiment, the processing circuitry may include at least one processor (and/or processor cores, distributed processors, networked processors, etc.), such as the at least one processor 210, which may be configured to control one or more elements of the UE 201, and thereby cause the UE 201 to perform various operations. The processing circuitry (e.g., the at least one processor 210, etc.) is configured to execute processes by retrieving program code (e.g., computer readable instructions) and data from the memory 230 to process them, thereby executing special purpose control and functions of the entire UE 201. Once the special purpose program instructions are loaded into the processing circuitry (e.g., the at least one processor 210, etc.), the at least one processor 210 executes the special purpose program instructions, thereby transforming the at least one processor 210 into a special purpose processor.

In at least one example embodiment, the memory 230 may be a non-transitory computer-readable storage medium and may include a random access memory (RAM), a read only memory (ROM), and/or a permanent mass storage device such as a disk drive, or a solid state drive. Stored in the memory 230 is program code (i.e., computer readable instructions) related to operating the UE 201, such as the methods discussed in connection with FIG. 3A and FIGS. 3C to 5, the wireless antenna 240, and/or the location sensor 250, etc. Such software elements may be loaded from a non-transitory computer-readable storage medium independent of the memory 230, using a drive mechanism (not shown) connected to the UE 201, or via the wireless antenna 240, etc.

In at least one example embodiment, the communication bus 220 may enable communication and data transmission to be performed between elements of the UE 201. The bus 220 may be implemented using a high-speed serial bus, a parallel bus, and/or any other appropriate communication technology.

The UE 201 may also include at least one wireless antenna 240. The wireless antenna 240 may include an associated radio unit (not shown) and may be used to transmit wireless signals in accordance with at least one desired wireless communication protocol, such as a 4G LTE communication protocol, a 5G NR communication protocol, a 6G communication protocol, a 7G communication protocol, a Wi-Fi communication protocol, etc. According to some example embodiments, the wireless antenna 240 may be a single antenna, or may be a plurality of antennas, etc.

The UE 201 may also include at least one location sensor 250 to calculate the absolute and/or relative location of the UE 201. The at least one location sensor 250 may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor 250 and/or the processor 210 may also use cellular network based positioning services, such as a cellular network location service (e.g., a location management function (LMF) service of the core network), an Assisted-GPS (A-GPS) function, etc., to determine the current location of the UE 201. In some example embodiments, the cellular network location service may also include a network based positioning solution, such as downlink time difference of arrival (DL-TDOA), an uplink time difference of arrival (UL-TDOA), an enhanced cell ID (E-CID), an uplink angle of arrival (UL-AoA), a downlink angle of departure (DL-AoD), a multi-cell round trip time (multi-RTT), etc., or any combination thereof. In some additional example embodiments, the cellular network location solution may also be run at the UE side (i.e., in UE based mode). However, the example embodiments are not limited thereto, and other location determining techniques may be used as well.

While FIG. 2A depicts an example embodiment of a UE 201, the UE device is not limited thereto, and may include additional and/or alternative architectures that may be suitable for the purposes demonstrated.

Figure 2B:
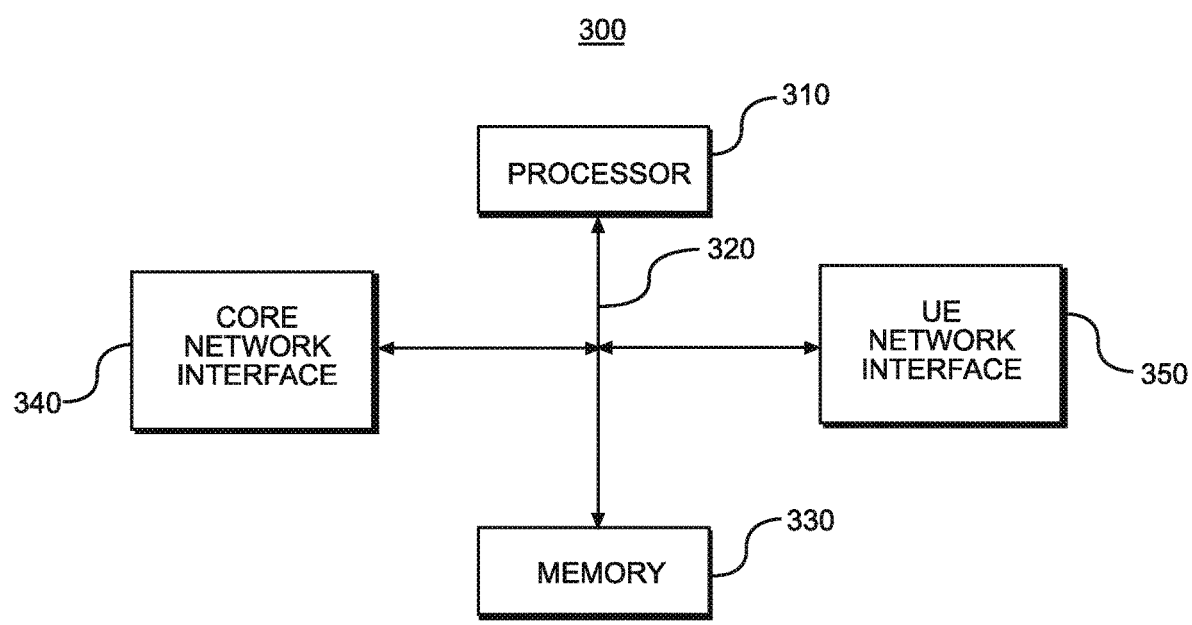
FIG. 2B illustrates a block diagram of an example NTN device according to at least one example embodiment.

FIG. 2B illustrates a block diagram of an example NTN device according to at least one example embodiment. The NTN device may be the NTN device 300 of FIG. 1, but the example embodiments are not limited thereto.

Referring to FIG. 2B, a NTN device 300 may include processing circuitry, such as the at least one processor 310, a communication bus 320, a memory 330, at least one core network interface 340, and/or at least one UE network interface 350, but the example embodiments are not limited thereto. The memory 330 may include various program code including computer executable instructions.

In at least one example embodiment, the processing circuitry may include at least one processor (and/or processor cores, distributed processors, networked processors, etc.), such as the at least one processor 310, which may be configured to control one or more elements of the NTN device 300, and thereby cause the NTN device 300 to perform various operations. The processing circuitry (e.g., the at least one processor 310, etc.) is configured to execute processes by retrieving program code (e.g., computer readable instructions) and data from the memory 330 to process them, thereby executing special purpose control and functions of the entire NTN device 300. Once the special purpose program instructions are loaded into, (e.g., the at least one processor 310, etc.), the at least one processor 310 executes the special purpose program instructions, thereby transforming the at least one processor 310 into a special purpose processor.

In at least one example embodiment, the memory 330 may be a non-transitory computer-readable storage medium and may include a random access memory (RAM), a read only memory (ROM), and/or a permanent mass storage device such as a disk drive, or a solid state drive. Stored in the memory 330 is program code (i.e., computer readable instructions) related to operating the NTN device 300, such as the methods discussed in connection with FIGS. 3A to 3B and FIGS. 4 to 5, the at least one core network interface 340, and/or at least one UE network interface 350, etc. Such software elements may be loaded from a non-transitory computer-readable storage medium independent of the memory 330, using a drive mechanism (not shown) connected to the NTN device 300, or via the at least one core network interface 340, and/or at least one UE network interface 350, etc.

In at least one example embodiment, the communication bus 320 may enable communication and data transmission to be performed between elements of the NTN device 300. The bus 320 may be implemented using a high-speed serial bus, a parallel bus, and/or any other appropriate communication technology.

The NTN device 300 may operate as at least one RAN node by itself or in combination with a core network gateway, such as core network gateway 400, but the example embodiments are not limited thereto. The NTN device 300 may operate as, for example, a 4G RAN, a 5G RAN, a 6G RAN, etc., and may be configured to schedule resource blocks for UE devices connected to the NTN device 300.

For example, the NTN device 300 may allocate time-frequency resources of a carrier (e.g., resource blocks with time and frequency dimensions) based on operation on the time domain (e.g., time division duplexing) and the frequency domain (e.g., frequency division duplexing). In the time domain context, the NTN device 300 (e.g., RAN node) will allocate a carrier (or subbands of the carrier) to one or more UEs (e.g., UEs 201, 202, 203, and/or 204, etc.) connected to the NTN device 300 during designated upload (e.g., uplink) time periods and designated download (e.g., downlink) time periods. When there are multiple UEs connected to the NTN device 300, the carrier is shared in time such that each UE is scheduled by the NTN device 300, and the NTN device 300 allocates each UE with their own uplink time and/or downlink time. In the frequency domain context, the NTN device 300 will allocate separate frequency subbands of the carrier to UEs simultaneously served by the NTN device 300, for uplink and/or downlink transmissions. Data transmission between the UE and the NTN device 300 may occur on a radio frame basis in both the time domain and frequency domain contexts. The minimum resource unit for allocation and/or assignment by the NTN device 300 to a particular UE device, i.e. a resource block, corresponds to a specific downlink/uplink time slot (e.g., one subframe, etc.) and/or a specific downlink/uplink frequency subband (e.g., twelve adjacent subcarriers, etc.).

For the sake of clarity and consistency, the example embodiments will be described as using the time domain, but the example embodiments are not limited thereto and the example embodiments may operate in the frequency domain.

The NTN device 300 may also include at least one core network interface 340, and/or at least one UE network interface 350. The at least one UE network interface 350 may include an associated radio unit (not shown) and may be used to transmit the wireless signals in accordance with a wireless communication protocol, such as 4G LTE wireless signals, 5G NR wireless signals, 6G wireless signals, 7G wireless signals, etc., to at least one UE device, such as UEs 201, 202, 203, and/or 204, etc. According to some example embodiments, the UE network interface 350 may be a single antenna, or may be a plurality of antennas, etc.

Additionally, the NTN device 300 may determine wireless network characteristics and/or wireless network conditions associated with the connections between the at least one UE device and the NTN device 300 through feedback signaling from the at least one UE device. For example, the UE network interface 350 may be used to receive from the at least one UE device channel state information of the channel(s) operated by the NTN device 300 in one or more radio technologies, e.g. received signal strength indicator (RSSI) associated with UEs connected to the NTN device 300, etc., receive signal-to-interference-plus-noise ratio (SINR), and/or interference level readings associated with the connected UEs, etc.

The NTN device 300 may communicate with a core network (e.g., backend network, backbone network, etc.) of the wireless network via a core network interface 340. The core network interface 340 may be a wireless network interface and may enable the NTN device 300 to communicate and/or transmit data to and from to network devices on the backend network, such as a core network gateway 400, a Data Network 500, etc., thereby allowing the UEs connected to the NTN device 300 to communicate and/or transmit data using the backend network to other networks, such as the Internet, telephone networks, VoIP networks, etc.

While FIG. 2B depicts an example embodiment of a NTN device 300, the NTN device is not limited thereto, and may include additional and/or alternative architectures that may be suitable for the purposes demonstrated.

Figure 3A:
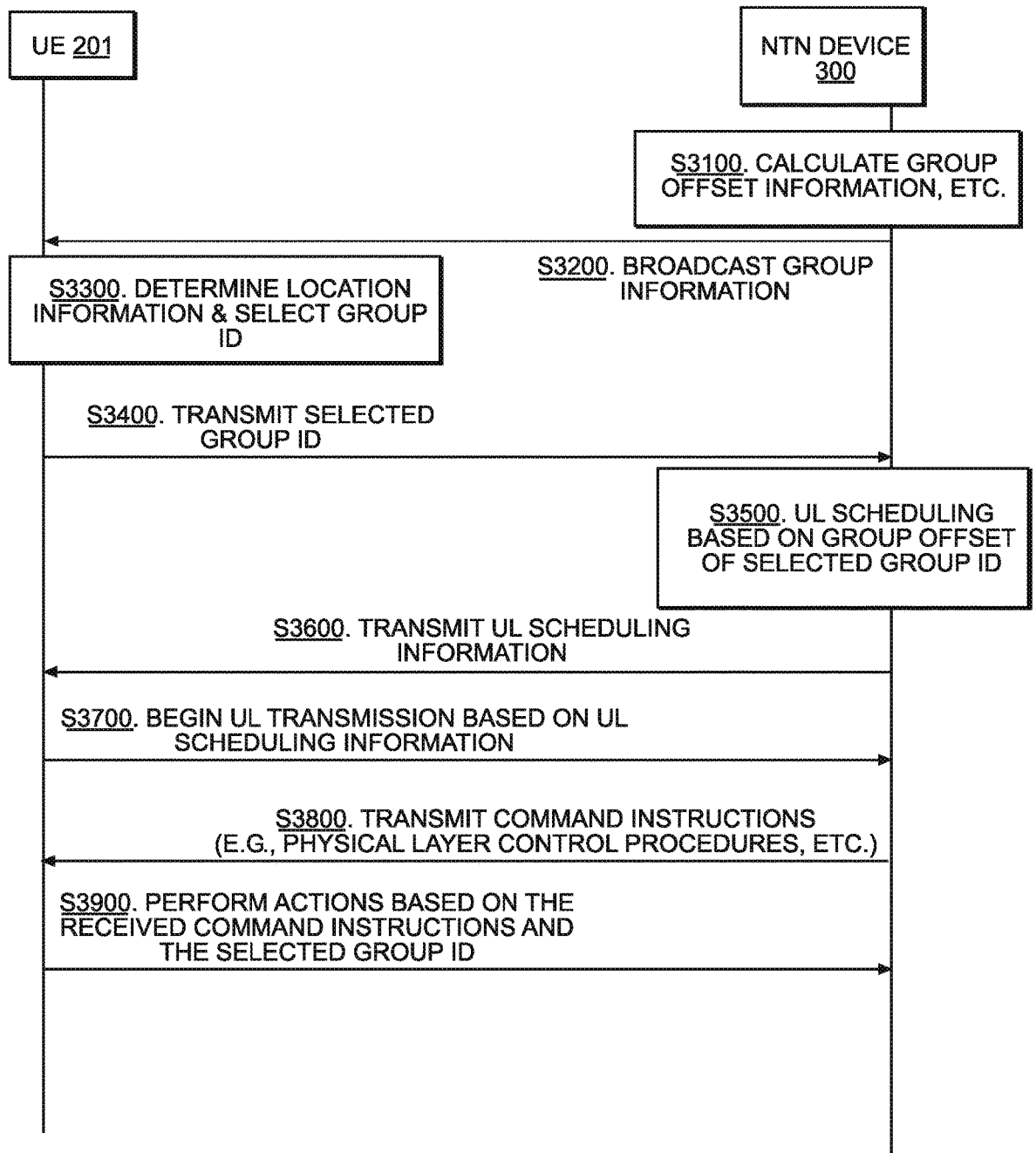
FIG. 3A illustrates a first transmission flow diagram according to at least one example embodiment.

FIG. 3A illustrates a first transmission flow diagram according to at least one example embodiment. More specifically, FIG. 3A illustrates an example transmission flow between at least one UE device, such as UE 201, and at least one NTN device, such as NTN device 300, according to a least one example embodiment.

According to at least one example embodiment, in operation S3100, the NTN device 300 may calculate one or more reference points (e.g., centroid locations of a group, synchronization locations, etc.) for one or more groups of a beam coverage area of the NTN device 300. For example, if a beam coverage area for the NTN device 300 includes a plurality of groups, a reference point may be calculated for each group of the plurality of groups. The NTN device 300 may also calculate timing advance offset information, at least one slot offset information, such as a UL frame offset, Doppler frequency shift offset information, etc., for each reference point, but the example embodiments are not limited thereto. The calculation of the groups, reference points, timing advance offset information, at least one slot offset information, etc., will be discussed in further detail in connection with FIG. 3B.

In operation S3200, the NTN device 300 broadcasts the calculated group information for each group of the plurality of groups included in the beam coverage area 100 to UE devices located within the beam coverage area 100. The group information may include a group identifier (group ID) to uniquely identify each group of the plurality of groups, reference point information including location information of the reference point (e.g., latitude and longitude information of the reference point, etc.) of each group, the calculated timing advance offset information for the group, the slot offset information for the group, and/or the Doppler frequency shift offset information for the group, etc. According to some example embodiments, the NTN device 300 may periodically broadcast the group information at desired time intervals, and/or may broadcast the group information based on core network commands, commands received from UE devices, commands received from the core network gateway 400, etc. Operations S3100 and S3200 will be discussed in greater detail in connection with FIG. 3B.

In operation S3300, the UE device 201 may calculate location information of the UE device 201's current location. For example, the UE device 201 may use at least one GNSS sensor to calculate the UE device 201's current location, but the example embodiments are not limited thereto. The UE device 201 also receives the broadcast message from the NTN device 300 which includes the group information of the plurality of groups of the beam coverage area 100 of the NTN device 300. The UE device 201 may then select one group from the plurality of groups included in the beam coverage area 100 of the NTN device 300 based on the UE device's determined current location information and the location information of the plurality of reference points included in the broadcast message. For example, the UE device 201 may compare the current location of the UE device 201 with the list of locations for the reference points included in the beam coverage area 100 and may select the reference point closest to the current location of the UE device, but the example embodiments are not limited thereto.

In operation S3400, the UE device 201 may transmit the group ID of the selected group to the NTN device 300. In some example embodiments, the UE device 201 transmits the selected group ID via a radio resource control (RRC) signaling message, but the example embodiments are not limited thereto. Operations S3300 and S3400 will be discussed in greater detail in connection with FIG. 3E.

In operation S3500, the NTN device 300 performs uplink (UL) and/or downlink (DL) scheduling for the UE device 201 (and other UE devices within the beam coverage area 100 of the NTN device 300) based on the group ID selected by the UE device 201. For example, the NTN device 300 may assign a UL slot for the UE device 201 based on the timing advance information, UL slot offset information, and/or the Doppler frequency shift offset information, etc., corresponding to the group ID selected by the UE device 201. In operation S3600, the NTN device 300 transmits the UL scheduling information for the UE device 201 to the UE device 201. In operation S3700, the UE 201 begins UL transmission based on the received UL scheduling information, including for example, using the UL slot offset information associated with the selected group ID of the UE 201.

According to some example embodiments, in operation S3800, the NTN device 300 may transmit one or more command instructions to the UE device 201, the command instruction instructing (and/or requesting, commanding, scheduling, etc.) the UE device 201 to perform one or more physical layer control procedures during a desired UL time slot. Examples of physical layer control procedures performed by the UE device 201 may include the activation of a Transmission Configuration Indication (TCI), which is an indication of a change of a transmission beam, performing channel state information (CSI) measurements on a designated CSI reference signal, and/or transmitting on-demand, aperiodic, or semi-persistent sounding reference signals (SRS), etc., but the example embodiments are not limited thereto. These actions are performed in the network UL time reference. In some example embodiments, the actions for UL transmission or report may be requested, activated, and/or scheduled using higher layer signaling, such as medium access control (MAC) control element (CE), etc.

In operation S3900, the UE device 201 may use the slot offset information of the selected group ID to determine the UL slot number to use when performing the requested action corresponding to the command instruction, for example performing the desired physical layer control procedure(s). The requested action may further include additional UL transmissions and/or reporting results of the requested action by the UE device 201 to the NTN device 300, but the example embodiments are not limited thereto. According to some example embodiments, operations S3800 and S3900 may be omitted.

Figure 3B:
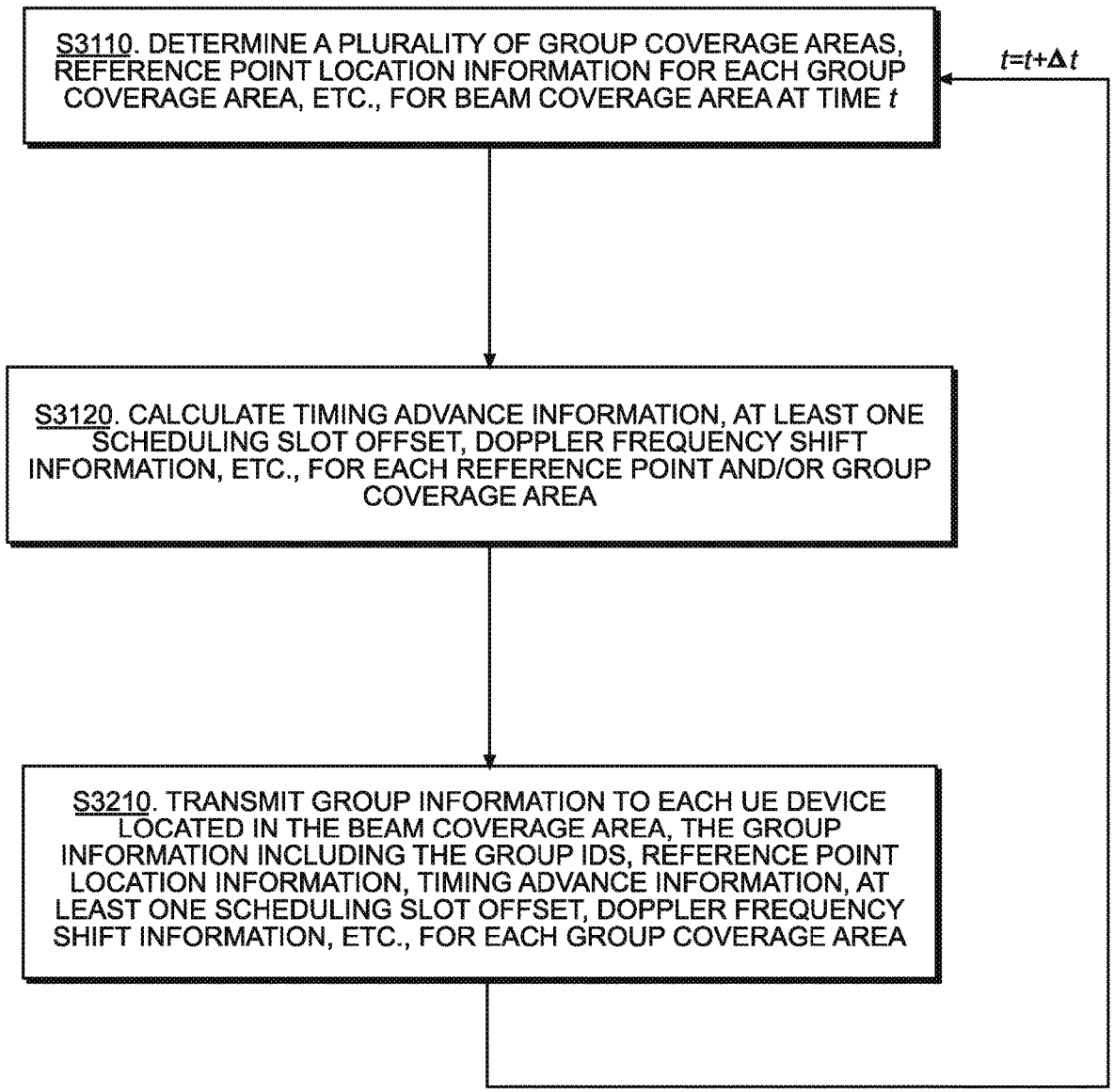
FIG. 3B is a flowchart illustrating a method for determining group offsets according to at least one example embodiment.
Figure 3C:
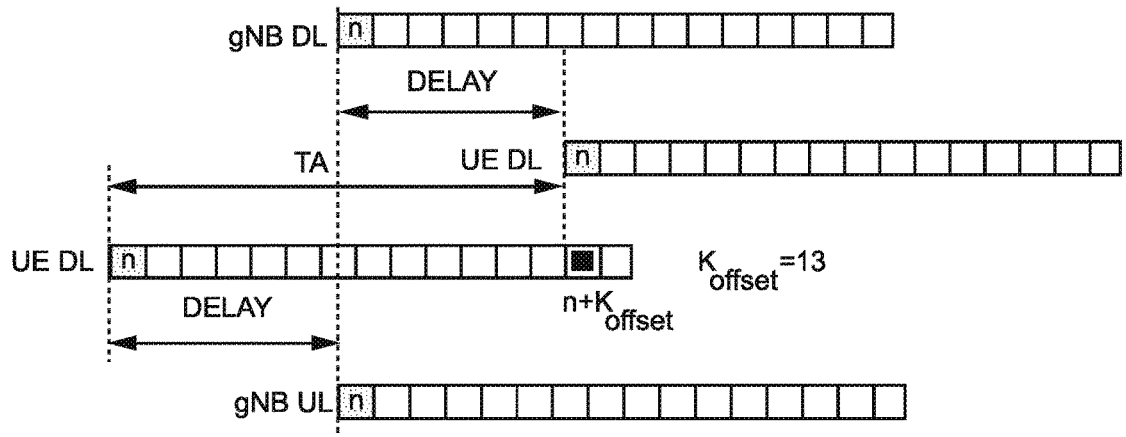
FIGS. 3C and 3D are example UL and DL transmission scheduling blocks according to some example embodiments.
Figure 3D:
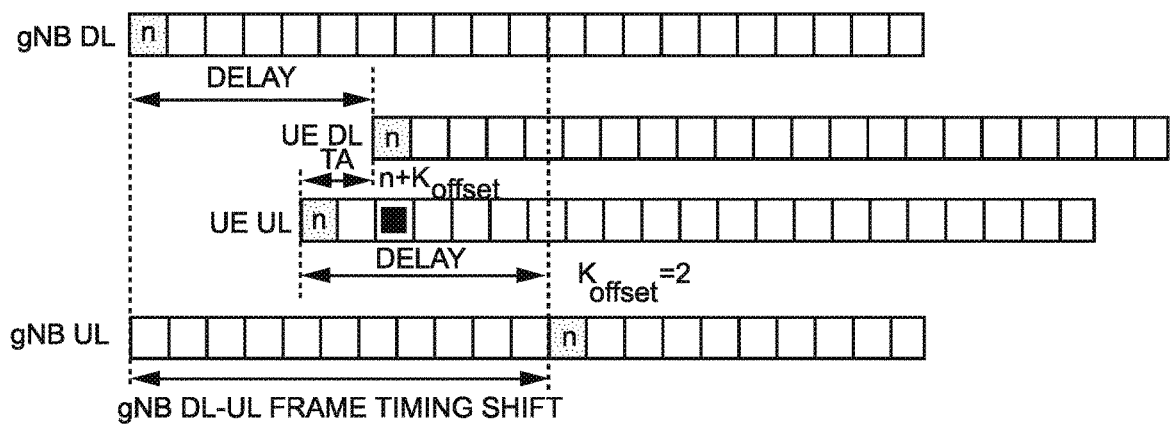

FIG. 3B is a flowchart illustrating a method for determining group offsets according to at least one example embodiment. More specifically, FIG. 3B illustrates a method of operating a NTN device, such as NTN device 300 to calculate group offset information for groups included in the NTN device's beam coverage area, such as beam coverage area 100. Additionally, FIGS. 3C and 3D are example UL and DL transmission scheduling blocks according to some example embodiments.

Referring now to FIG. 3B, according to at least one example embodiment, in operation S3110 the NTN device 300 determines the number of groups and corresponding group reference points desired for the NTN device 300's beam coverage area 100 and the locations of the coverage areas of the groups and the group reference points at a time t. The NTN device 300 may determine the number of groups based on the geographical area covered by the beam coverage area 100 and by determining the length of a UL slot offset, and setting the size and location of each group such that the UE devices located within a single group may use the same baseline timing advance and/or the same UL slot offset. The baseline timing advance may include the group TA (e.g., the TA of the group selected by the UE device, etc.) and an individual TA adjustment for each individual UE device. Further, the NTN device 300 may determine a relationship between a desired group and the neighboring groups adjacent to the desired group so that the neighboring groups can have timing advances and/or UL slot offsets that are incremented by a desired amount (e.g., incremented by a single UL slot, two UL slots, etc.), however the example embodiments are not limited thereto. The NTN device 300 may determine the number of groups based on the timing requirements for receiving uplink transmissions in a defined time period and in some example embodiments may modify the number of groups based on the subcarrier spacing of the system.

For example, according to at least one example embodiment, the NTN device 300 may determine a physical location of a first reference point corresponding to a first group based on a centroid value of the beam coverage area 100 of the NTN device 300. However, the example embodiments are not limited thereto, and the location of the reference point may be selected based on other criteria, such as the location of the reference point being assigned based on a desired physical location within the coverage area of the corresponding group and/or the beam coverage area, the location of the reference point being assigned based on an average and/or median propagation delay value for all of the points of the group coverage area, the elevation angle (e.g., line-of-sight angle from the horizon) of the NTN device 300 (wherein the elevation angle with the largest differential round-trip delay is at approximately 10 degrees from the horizon, and the smallest differential round-trip delay is at approximately 90 degrees from the horizon), the location of the reference point being assigned based on historical data of the locations of UE devices (e.g., areas of high concentration of UE devices), etc., but the example embodiments are not limited thereto. Moreover, in some example embodiments, a higher density (e.g., concentration, etc.) of reference points may be desired in order to decrease the differential delay within each group, which would also result in a reduced potential timing error and/or reduced potential frequency error, etc. However, if the density of reference points is increased, the signaling overhead (e.g., SIB overhead, etc.) of the NTN device 300's broadcast of the group information may increase due to the increased data being transmitted by the NTN device 300, as well as additional time required for decoding the group information broadcast by the UE device(s).

The NTN device 300 may set the size of the coverage area of the first group such that every location within the first group's coverage area at the lowest possible elevation angle with the satellite (e.g., the NTN device 300 elevation angle that produces the longest propagation delay differences, which typically corresponds to an elevation angle of 10 degrees, but the example embodiments are not limited thereto) will be within a desired time period, such as a single slot duration for UL data transmission, but the example embodiments are not limited thereto. For example, if a UL slot has a duration of 1 ms, the NTN device 300 may set the size and/or boundary of the first group coverage area as including all locations that have a signal propagation delay of not more than 1 ms above the signal propagation delay of the first reference point, however the example embodiments are not limited thereto, and for example, the UL slot duration may be greater or lesser than 1 ms, the boundary may be set to less than an entire UL slot duration, etc. Additionally, the UL slot duration may be set by the NTN device 300 according to the UE scheduling procedures of the wireless communication protocol used by the NTN device 300, etc.

The NTN device 300 may then select the reference points of groups adjacent to the first group by selecting locations that have a distance corresponding to the desired time period away from the first reference point, or in other words, the distance between two adjacent reference points may be approximately equal to the diameter of the first reference point's coverage area, etc., but the example embodiments are not limited thereto. For example, assuming the UL slot duration is 1 ms again, a second reference point may be selected as being a location that is 2 ms away from the first reference point location at the lowest possible elevation angle with the satellite, but the example embodiments are not limited thereto. Additionally, the NTN device 300 may then set the boundary and/or size of the of the second group coverage area as including all locations that have a signal propagation delay of not more than 1 ms more than the signal propagation delay of the second reference point, and therefore the signal propagation delay at a location that at the perimeter of the second group coverage area and the first group coverage area at the lowest possible elevation angle with the satellite (e.g., approximately 10 degrees), may be 1 ms away from both the second reference point and the first reference point, etc., however, the example embodiments are not limited thereto, and for example, there may be overlap in the coverage areas of adjacent groups, and/or the coverage areas of adjacent groups may not abut, etc. This process may be repeated until the entire beam coverage area 100 is divided into group coverage areas, etc., however the example embodiments are not limited thereto.

Additionally, according to some example embodiments, the determination of the number of groups, location of groups reference points, etc., may be performed by a user and uploaded to the NTN device 300.

In operation S3120, the NTN device 300 may calculate and/or compute a timing advance (TA) value, a UL slot number offset ($K_{offset}$), and/or a Doppler frequency shift offset for each reference point of the beam coverage area 100. For example, the timing advance value is calculated to compensate for the round-trip transmission delay between the reference point and the NTN device 300. More specifically, the timing advance value is used by the UE device within the relevant group coverage area (e.g., the UE devices using a particular reference point) to transmit at a time T−TA so that the UE device 201's transmission reaches the NTN device 300 at the time (e.g., at time T) corresponding to the UE device 201 UL assigned slot.

Additionally, at least one slot offset information, such as UL slot offset information, for the group may be assigned by the NTN device 300 based on the number of groups included in the beam coverage area 100. For example, different UL slot offsets may be assigned to each group of the beam coverage area 100, so that UE devices of different groups do not transmit to the NTN device 300 using the same slot offset, but the example embodiments are not limited thereto.

According to at least one example embodiment, the NTN device 300 may align the timing of the scheduled gNB node UL and DL frames with the timing of the scheduled UE device UL and DL frames by setting the UL slot offset (e.g., the scheduling slot offset, slot offset, etc.) to a desired value. For example, as shown in FIG. 3C, the NTN device 300 (e.g., the gNB node, etc.) has the same frame timing for both the DL transmissions and the UL transmissions (e.g., slot N is aligned and occurs at the same time for both the gNB DL frame and the gNB UL frame). The NTN device 300 may calculate the TA value and the UL slot number offset ($K_{offset}$) for the group corresponding to the UE device 201, such that the delay experienced by the UL signal transmitted by the UE device 201, and the DL signal transmitted by the NTN device 300, are compensated for by either the NTN device 300 or the UE device 201. For example, in FIG. 3C, the timing advance value may be equal to the round-trip signal propagation delay, and the UE device 201 applies the timing advance TA for UL transmission. The NTN device 300 would schedule the UE device 201 at slot n+$K_{offset}$ for UL transmission for the packet to arrive at the corresponding slot n of the NTN device 300's UL frame. The NTN device 300 may also issue a MAC CE command (e.g., TCI activation) or Downlink Control Information (DCI) command (e.g., aperiodic SRS transmission) requesting the UE device 201's action at the time of UL slot n+$K_{offset}$ for the NTN device 300's transmission or reception at slot n in its DL or UL frame. Moreover, the UL slot number offset ($K_{offset}$) may be set as 13 slots in this example to correspond to the total delay time between the start of the UE device 201's UL transmission and DL reception. However, the example embodiments are not limited thereto, and other TA values, delay values, and/or $K_{offset}$ values may be used.

Additionally, as shown in FIG. 3D, the NTN device 300 (e.g., the gNB node) maintains a delay offset in the NTN device 300's UL reception relative to the NTN device 300's DL transmission timing, or in other words will shift the gNB node's UL frame timing such that the UL and DL frames are not aligned. For example, the NTN device 300 may take the timing shift between its DL and UL frames into account in the calculation of the slot number offset of the group so that a smaller TA value and a smaller $K_{offset}$ value is used between the start of the UE device 201's UL transmission and the UE device 201's DL reception. As shown in FIG. 3D, a small TA value may be applied to the start of the UE device 201's UL transmission when the NTN device 300 partially compensates for the round-trip signal propagation delay between the UE device 201 and the NTN device 300. The NTN device 300 may schedule the UE device 201 at UL slot n+$K_{offset}$ for the packet to arrive at slot n of the NTN device 300's UL frame. In this example, the slot number offset ($K_{offset}$) is 2 and the timing shift between the DL and UL frame timings at the gNB node is 11 slots. However, the example embodiments are not limited thereto, and other TA values, delay values, and/or $K_{offset}$ values may be used.

The NTN device 300 may also calculate the Doppler frequency shift offset for each of the reference points of the plurality of groups of the beam coverage area 100 based on the location information of each of the reference points as well. In the event that the NTN device 300 is in motion relative to the surface of the Earth, a change in the frequency and wavelength of the transmission signal emitted by the NTN device 300, or conversely, the transmission signal emitted by a UE device (e.g., UE device 201, 202, 203, and/or 204, etc.) to the NTN device 300, may be experienced due to the Doppler effect and the motion of the NTN device 300. For example, a LEO satellite may travel at approximately 7.56 km/s relative to the UE on earth at an altitude of approximately 600 km, which can cause a frequency shift of as much as 24 ppm, which is the equivalent to a frequency error of ~24 kHz for a 2 Ghz carrier and ~720 kHz for a 30 GHz carrier. This frequency error may be greater than the, for example, orthogonal frequency-division multiplexing (OFDM) subcarrier spacing used for those carrier frequencies.

Consequently, the NTN device 300 may compensate for the frequency error seen in the transmission signal emitted by the NTN device 300, and/or compensate for the frequency error seen in the transmission signal received from the UE device, by calculating a Doppler frequency offset information for each reference point (e.g., reference points 111 and 121, etc.) and/or group (e.g., groups 110 and 120, etc.) of the NTN device 300's beam coverage area 100 based on the known velocity of the NTN device 300 and the expected frequency of the transmission signal, as shown in the following formula:

$$\Delta f = (\Delta v/c)^* f_0 \quad \quad \text{Formula 1}$$

where $\Delta f$ is the Doppler frequency error (e.g., change in frequency) caused by the Doppler effect; $\Delta v$ is the change in the velocity of the NTN device 300, c is the speed of light, and $f_0$ is the frequency of the transmission signal.

The calculated Doppler frequency error may be used as the Doppler frequency offset information and applied to (e.g., added to or subtracted from) the transmission signal to be emitted by the NTN device 300 to the UE device, or applied to the received transmission signal received by the NTN device 300 from the UE device, to compensate for the Doppler frequency error in those transmission signals.

In operation S3210, the NTN device 300 transmits and/or broadcasts the calculated group information, such as the timing advance information, UL slot number offset, and/or Doppler frequency shift offset, etc., calculated for each reference point, to the UEs located within the beam coverage area 100. In at least one example embodiment, the group information may be transmitted in a system information block (SIB) message, but the example embodiments are not limited thereto, and other signaling message types and/or communication message types may be used as well. The group information may include the group IDs corresponding to the groups of the beam coverage area 100, the reference point information corresponding to the groups, including location information of the reference points, the timing advance information corresponding to the groups, the slot offset information corresponding to the groups, and/or the Doppler frequency shift offset information corresponding to the groups, etc., but the example embodiments are not limited thereto.

According to at least one example embodiment, at time t+Δt, the NTN device 300 may repeat operations S3110 to S3210, wherein Δt is any desired time period. However, the example embodiments are not limited thereto, and the NTN device 300 may perform the operations of FIG. 3B at other desired times, including, for example, when the NTN device 300 is initialized, the NTN device 300 and/or the beam coverage area 100 changes positions and/or altitudes, etc.

Figure 3E:
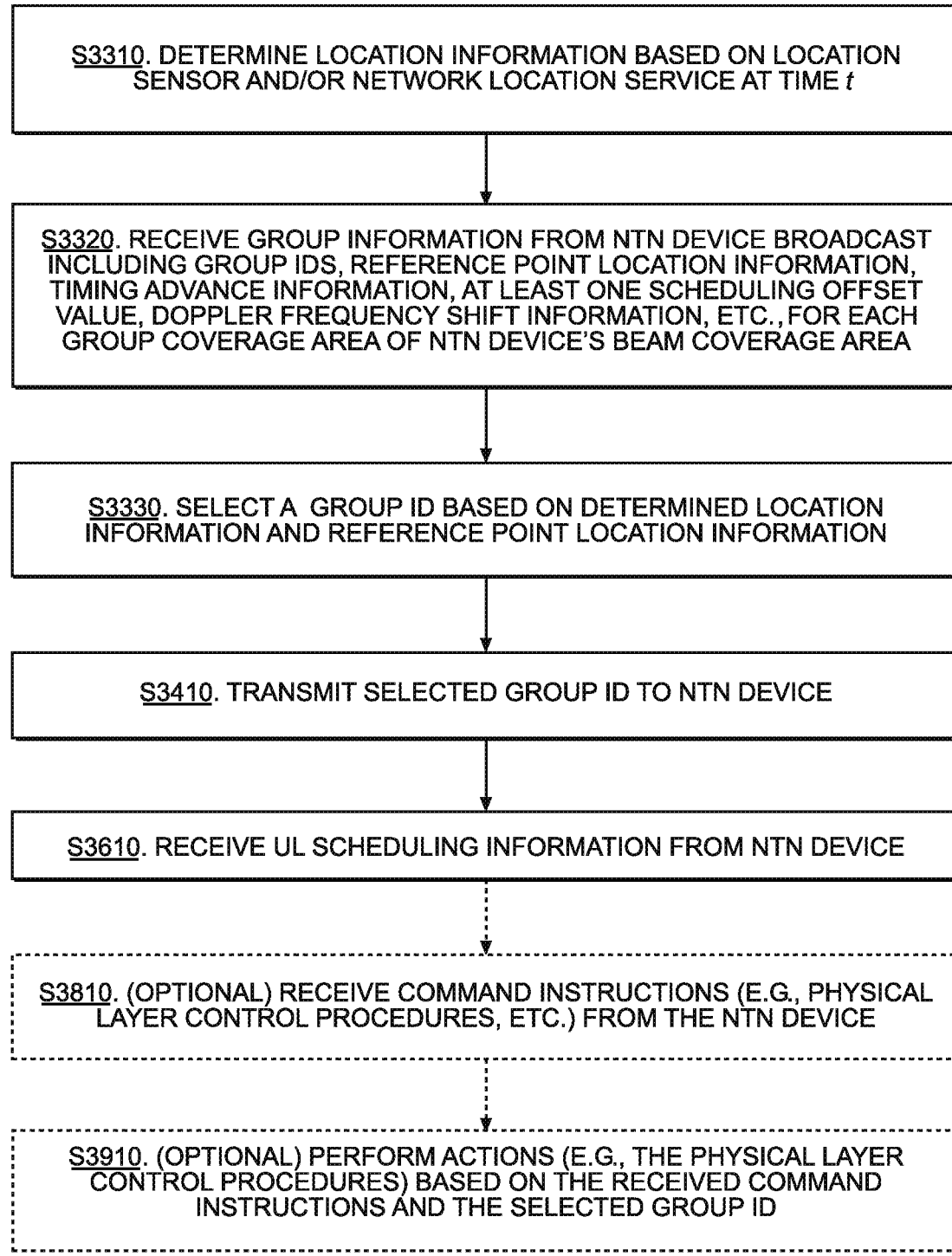
FIG. 3E is a flowchart illustrating a method for selecting a group identifier according to at least one example embodiment.

FIG. 3E is a flowchart illustrating a method for selecting a group identifier according to at least one example embodiment. More specifically, FIG. 3E illustrates a method of operating a UE device, such as UE device 201, to select a group ID of a NTN device's beam coverage area, such as the beam coverage area 100 of NTN device 300.

According to at least one example embodiment, in operation S3310, the UE device 201 may calculate current location information (e.g., location data, position data, coordinates, self-location information, etc.). According to some example embodiments, the UE device 201 may calculate the current location information using at least one GNSS sensor, network location requests and responses (e.g., a network location response from a LMF network service, an A-GPS response, etc.), dead reckoning techniques, manual entry by a user of the UE device 201, etc., but the example embodiments are not limited thereto. Additionally, the UE device 201 may turn off, power down, and/or place into a reduced power or sleep-mode, the GNSS sensor once the UE device 201 calculates the current location information, in order to reduce the power consumption of the UE device 201 and increase the energy efficiency of the UE device 201.

In operation S3320, the UE device 201 may receive a broadcast message from the NTN device 300, the broadcast message including group information corresponding to the plurality of groups included within the beam coverage area 100 of the NTN device 300. For example, in at least one example embodiment, the broadcast message may be a SIB message, and the UE device 201 may decode the received SIB message to receive the group IDs, reference point information, timing advance information, slot offset information, Doppler frequency shift offset information, etc., associated with each group of the beam coverage area 100.

In operation S3330, the UE device 201 may select one of the group IDs of the plurality of group IDs included in the received broadcast message based on the UE device 201's current location. For example, the UE device 201 may select the group ID corresponding to the reference point that is closest to the calculated location information from operation S3310, but the example embodiments are not limited thereto, and the group ID may be selected based on other considerations, such as an estimated location of the UE device 201 based on a current rate and direction of movement of the UE device 201, channel state information associated with the various groups, historic location information of the UE device 201 (e.g., a home location for the UE device 201, etc.), etc.

In operation S3410, the UE device 201 may use the selected group ID, and more particularly at least one of the timing advance associated with the selected group ID, slot offset associated with the selected group ID, Doppler frequency shift offset information associated with the selected group ID, etc., to communicate with the NTN device 300. For example, the UE device 201 may transmit a signaling message, such as a RRC message, which includes the selected group ID to the NTN device 300 using the timing advance, slot offset, and/or the Doppler frequency shift offset information, etc. As another example, the UE device 201 may use a random access procedure (RAP) to implicitly transmit and/or indicate the selected group ID to the NTN device 300 by transmitting a UL message to the NTN device 300 during a designated random access UL slot corresponding to the group ID selected by the UE device 201. For example, the UE device 201 may transmit a UL message to the NTN device 300 including a physical random access channel (PRACH) preamble to the NTN device 300 during a UL slot designated by the NTN device 300 for UEs in group ID X, and upon reception of the PRACH preamble, the NTN device 300 may implicitly determine that the UE device 201 has selected group ID X. However, the example embodiments are not limited thereto, and other methods may be used by the UE device(s) to indicate the selected group ID to a NTN device.

In operation S3610, the UE device 201 may receive UL scheduling information from the NTN device 300 based on the selected group ID of the UE device 201 that was transmitted and/or implicitly indicated to the NTN device 300.

In operation S3810, the UE device 201 may optionally receive one or more command instructions from the NTN device 300. The command instructions may be an instruction to perform at least one physical layer procedure during a desired UL time slot specified in the command instruction. Additionally, in some example embodiments, the NTN device 300 may transmit the command instruction using higher layer signaling, such as a medium access control (MAC) control element (CE), etc.

In operation S3910, the UE device 201 may optionally perform an action(s) corresponding to the command instruction. For example, the performed action may be at least one of an activation of a Transmission Configuration Indication (TCI), performing channel state information (CSI) measurements on a designated CSI reference signal, and/or transmitting on-demand, aperiodic, or semi-persistent sounding reference signals (SRS), etc., but the example embodiments are not limited thereto.

Additionally, according to at least one example embodiment, the UE device 201 may repeat operations S3310 to S3610 periodically, such as at a desired time interval Δt, but the example embodiments are not limited thereto. For example, the UE device 201 may initiate the method of FIG. 3E upon the detection of movement of the UE device 201, upon a manual command input by the user of the UE device 201, upon an instruction received by the NTN device 300, etc. Several of these examples are discussed in connection with FIGS. 4 and 5.

Figure 4:
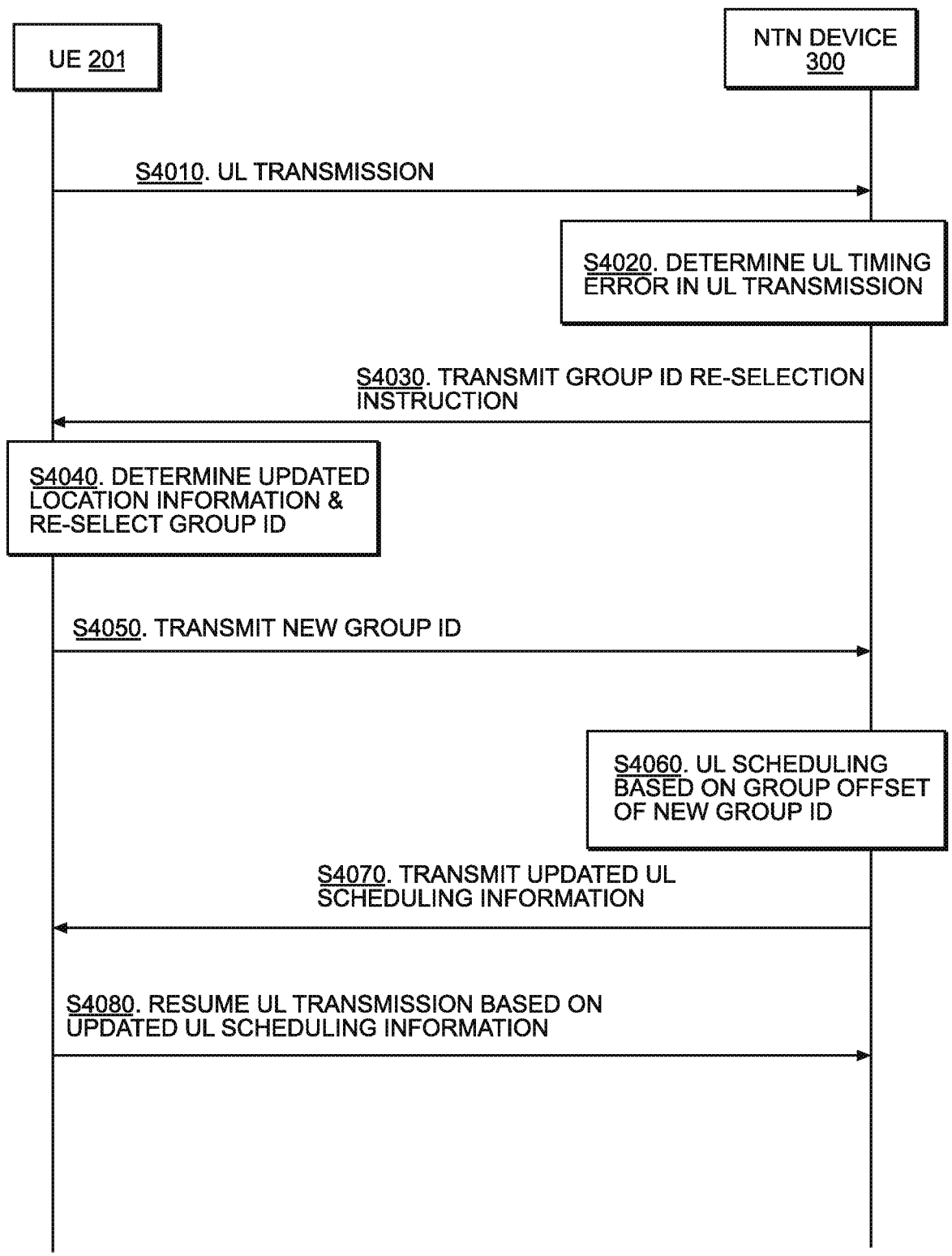
FIG. 4 is a second transmission flow diagram according to at least one example embodiment.

FIG. 4 is a second transmission flow diagram according to at least one example embodiment. More specifically, FIG. 4 illustrates a transmission flow between a UE device, such as UE device 201, and a NTN device, such as NTN device 300, wherein the NTN device 300 instructs the UE device 201 to re-select a group ID based on UL transmissions received by the NTN device 300.

According to at least one example embodiment, in operation S4010, the UE device 201 performs at least one UL transmission based on the group offset information selected in S3300 of FIG. 3A and the UL scheduling information received from the NTN device 300 in operation S3600 of FIG. 3A, but the example embodiments are not limited thereto. In operation S4020, the NTN device 300 may determine and/or calculate a timing advance "drift" in the UL transmission received from the UE device 201. In other words, if the UL transmission from the UE device 201 is received by the NTN device 300 outside of the expected UL slot for the UL transmission, based on the selected group ID of the UE device 201, then the NTN device 300 may determine that the UE device 201 should use a different reference point and group offset information for UL transmissions of the UE device 201. According to at least one example embodiment, the NTN device 300 may compare the time at which the UL transmission from the UE device 201 is received with a desired threshold value based on the timing advance value associated with the UE device 201's group ID, and if the time exceeds the desired threshold value, the NTN device 300 determines that the UE device 201 should select a new group ID and/or new timing advance. For example, the UE device 201 may have changed locations after selecting the previous group ID, and therefore the previously used timing advance value, scheduling slot offset information, Doppler frequency shift offset information, etc., are no longer valid for the UE device 201, etc. Consequently, in operation S4030, the NTN device 300 transmits a command (e.g., instruction, request, etc.) to the UE device 201 to select a new group. According to some example embodiments, the NTN device 300 may transmit the group re-selection instruction via a RRC signaling message, but the example embodiments are not limited thereto.

In operation S4040, the UE device 201 calculates the UE device 201's current location again, and re-selects a group ID based on the UE device 201's new location information and the location information associated with the reference points of the beam coverage area 100. In operation S4050, the UE device 201 transmits the new group ID to the NTN device 300. In some example embodiments, the UE device 201 transmits the new group ID via a radio resource control (RRC) signaling message, but the example embodiments are not limited thereto.

In operation S4060, the NTN device 300 determines UL scheduling information for the UE device 201 based on the new group ID selected by the UE device 201. In operation S4070, the NTN device 300 transmits the updated UL scheduling information to the UE device 201. In operation S4080, the UE device 201 may resume UL transmission to the NTN device 300 based on the received UL scheduling information, including the group offset information of the newly selected group ID.

Figure 5:
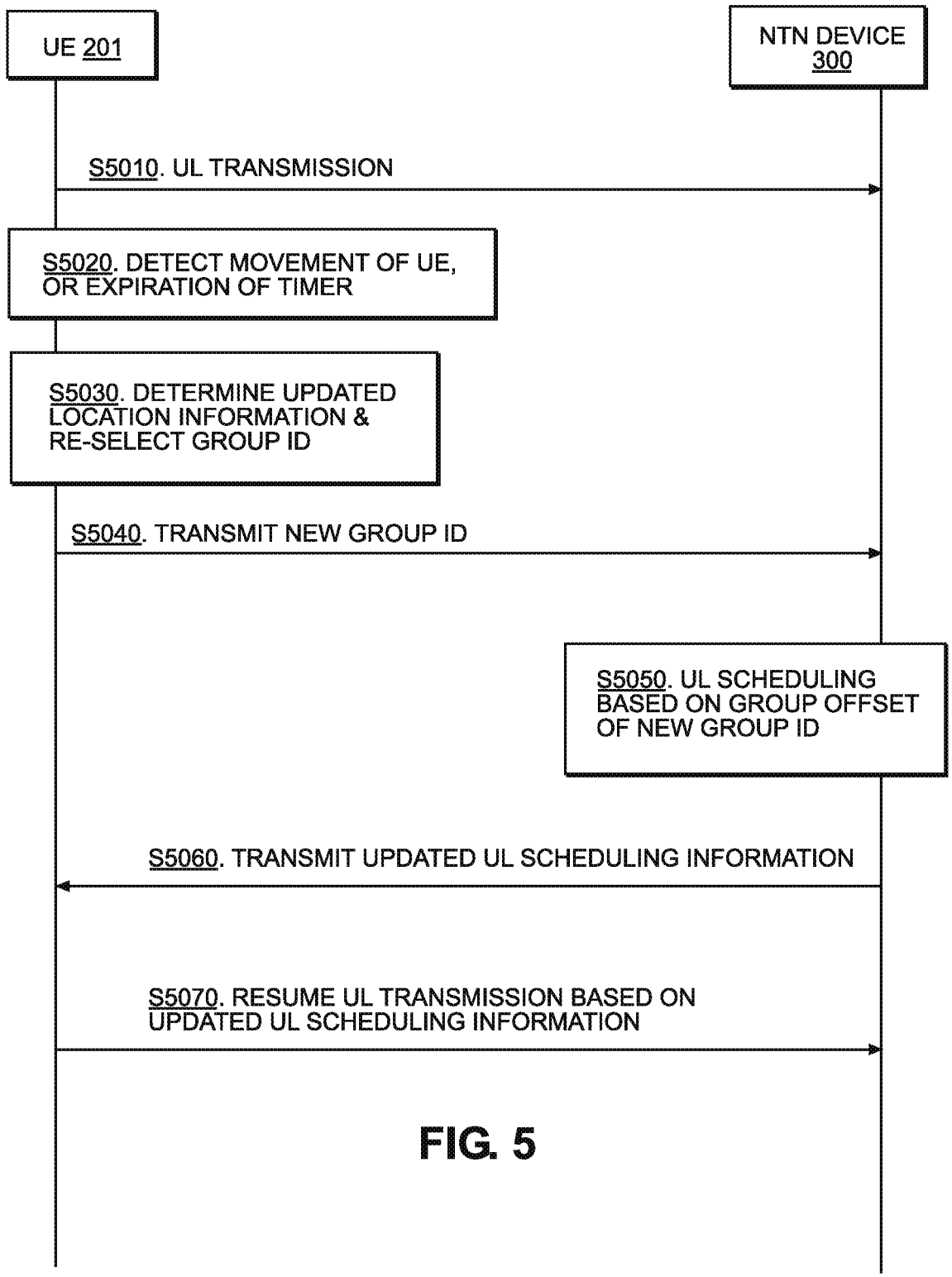
FIG. 5 is a third transmission flow diagram according to at least one example embodiment.

FIG. 5 is a third transmission flow diagram according to at least one example embodiment. FIG. 5 illustrates a transmission flow between a UE device, such as UE device 201, and a NTN device, such as NTN device 300, wherein the UE device 201 determines that it is desirable to select a new group ID and transmits the new group ID information to the NTN device 300.

According to at least on example embodiment, in operation S5010, the UE device 201 may perform at least one UL transmission based on the group offset information selected in S3300 of FIG. 3A and the UL scheduling information received from the NTN device 300 in operation S3600 of FIG. 3A, but the example embodiments are not limited thereto. In operation S5020, a timer of a desired length of time operated by the UE device 201 may expire. Additionally, in at least one example embodiment, the UE device 201 may determine that it has moved based on inertial sensors (e.g., gyroscopes, accelerometers, etc.), GNSS sensors, and/or cellular network based positioning, etc. In operation S5030, in response to determining that the timer has expired and/or the UE device 201 has moved, the UE device 201 may recalculate the UE device 201's current location and re-select the group ID based on the new and/or updated location information. For example, the UE device 201 may determine that the UE device 201 is out of the coverage area (e.g., range) of the previously selected group based on the updated location information and/or that the selected group ID may have expired, and in response may select a new group ID based on the locations of the reference points of the beam coverage area 100, etc.

In operation S5040, the UE device 201 transmits the updated group ID to the NTN device 300. According to some example embodiments, the UE device 201 may transmit the updated group ID via a RRC signaling message, but the example embodiments are not limited thereto. In operation S5050, the NTN device 300 may re-schedule the UL transmission of the UE device 201 based on the updated group ID. In operation S5060, the NTN device 300 may transmit the new UL scheduling information to the UE device 201. Finally, in operation S5070, the UE device 201 may resume UL transmissions to the NTN device 300 based on the updated UL scheduling information and the group offset information associated with the updated group ID.

While FIGS. 3A to 5 illustrate various methods for accurately and efficiently determining communication, transmission, and/or signaling offsets between at least one UE device and at least one NTN device based on location information of the UE device, the example embodiments are not limited thereto, and other methods may be used to determine communication offset information for the UE device based on the location information of the UE device.

Various example embodiments are directed towards a wireless NTN network system capable of accurately and efficiently determining communication, transmission, and/or signaling offsets between at least one UE device and at least one NTN device based on location information of the UE device. By determining the location information of the at least one UE device and comparing the location information of the UE device with designated reference points of a beam coverage area of the at least one NTN device, accurate and/or efficient communication may be performed between the at least one UE device and the at least one NTN device that compensates for the significant signal propagation delays seen in wireless communication using NTN devices.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A user equipment (UE) device, comprising:
a memory storing computer readable instructions; and
at least one processor configured to execute the computer readable instructions to cause the UE device to:
determine location information of the UE device,
receive group information from a non-terrestrial network (NTN) device, the group information including a plurality of group identifiers (IDs) corresponding to a plurality of group coverage areas within a beam coverage area associated with the NTN device, each of the plurality of group IDs including location information of a corresponding reference point within the corresponding group coverage area and group offset information associated with the corresponding group coverage area, select a group ID from the plurality of group IDs based on the location information of the UE device and the location information of the plurality of reference points, and perform an uplink (UL) transmission with the NTN device based on the group offset information of the selected group ID.

2. The UE device of claim 1, wherein the group offset information of each of the group IDs includes at least one of:
timing advance (TA) information associated with the corresponding reference point;
at least one scheduling slot offset associated with the corresponding reference point;
Doppler frequency shift offset information associated with the corresponding reference point; or
any combinations thereof.

3. The UE device of claim 1, wherein the at least one processor is further configured to cause the UE device to:
transmit the selected group ID to the NTN device;
receive UL scheduling information from the NTN device based on the selected group ID; and
perform the UL transmission based on the received UL scheduling information.

4. The UE device of claim 1, wherein the at least one processor is further configured to cause the UE device to:
receive at least one command instruction from the NTN device; and
perform at least one action based on the received at least one command instruction from the NTN device and the group offset information of the selected group ID.

5. The UE device of claim 4, wherein the performed at least one action includes at least one of:
transmitting a channel state information (CSI) report based on the group offset information of the selected group ID;
executing a medium access control (MAC) control element (CE) command from the NTN device based on the group offset information of the selected group ID;
updating a beamforming weight for data reception based on the group offset information of the selected group ID;
transmitting a sounding reference signal (SRS) based on the group offset information of the selected group ID; or
any combinations thereof.

6. The UE device of claim 1, wherein the at least one processor is further configured to cause the UE device to determine the location information of the UE device using at least one of a global navigation satellite system (GNSS), an inertial measurement sensor, a network location service response from a location server, or any combinations thereof.

7. The UE device of claim 1, wherein the at least one processor is further configured to cause the UE device to:
receive a group ID re-selection instruction from the NTN device;
determine updated location information of the UE device in response to the group ID re-selection instruction;
select a new group ID from the plurality of group IDs based on the updated location information of the UE device and the location information of the plurality of reference points; and
transmit the new group ID to the NTN device.

8. The UE device of claim 1, wherein the at least one processor is further configured to cause the UE device to:
initiate a timer for a desired time period;
determine updated location information of the UE device in response to an expiration of the desired time period;
select a new group ID from the plurality of group IDs based on the updated location information of the UE device and the location information of the plurality of reference points; and
transmit the new group ID to the NTN device.

9. The UE device of claim 1, wherein the at least one processor is further configured to cause the UE device to:
determine updated location information of the UE device in response to detected movement of the UE device;
determine whether the updated location information is out of a range associated with the selected group ID;
select a new group ID from the plurality of group IDs based on the determined updated location information of the UE device and the location information of the plurality of reference points in response to the updated location information being out of the range associated with the selected group ID; and
transmit the new group ID to the NTN device.

10. The UE device of claim 1, wherein the NTN device is at least one of a Geostationary Earth Orbiting (GEO) satellite, a Medium Earth Orbiting (MEO) satellite, a Low Earth Orbiting (LEO) satellite, an Unmanned Aerial System (UAS) vehicle, a High Altitude Platform Station (HAPS) vehicle, a manned aerial vehicle (MAV) device, or any combinations thereof.

11. A non-terrestrial network (NTN) device, comprising:
at least one wireless transmitter configured to communicate with at least one user equipment (UE) device located within a beam coverage area of the NTN device, the beam coverage area including a plurality of group coverage areas, each of the plurality of group coverage areas including a reference point;
a memory storing computer readable instructions; and
at least one processor configured to execute the computer readable instructions to cause the NTN device to:
determine group offset information for each of the plurality of group coverage areas based on a distance between the NTN device and a location of the reference point corresponding to the group coverage area;
transmit group information to the at least one UE device, the group information including a plurality of group identifiers (IDs) corresponding to the plurality of group coverage areas, each of the plurality of group IDs including location information of the corresponding reference point of the group coverage area, and group offset information associated with the corresponding group coverage area;
receive a message from the at least one UE device indicating a group ID selected from the plurality of group IDs, the selected group ID being selected based on a location of the at least one UE device and the location information of the plurality of reference points; and
communicate with the at least one UE device based on the group offset information of the selected group ID.

12. The NTN device of claim 11, wherein the at least one processor is further configured to cause the NTN device to:
determine the group offset information for each of the plurality of reference points by calculating at least one of:

Timing Advance (TA) offset information associated with the corresponding reference point, at least one scheduling slot offset associated with the corresponding reference point, Doppler frequency shift offset information associated with the corresponding reference point, or any combinations thereof.

13. The NTN device of claim 11, wherein the at least one processor is further configured to cause the NTN device to:

determine uplink (UL) scheduling information for the at least one UE device based on the selected group ID;

transmit the determined UL scheduling information to the at least one UE device; and receive an UL transmission from the at least one UE device based on the determined UL scheduling information.

14. The NTN device of claim 11, wherein the at least one processor is further configured to cause the NTN device to:

transmit at least one command instruction to the at least one UE device, wherein the transmitted at least one command instruction causes the at least one UE device to perform at least one action based on the command instructions from the NTN device and the group offset information of the selected group ID.

15. The NTN device of claim 14, wherein the at least one processor is further configured to cause the NTN device to:

receive a channel state information (CSI) report based on the group offset information of the selected group ID;

transmit a medium access control (MAC) control element (CE) command from the NTN device based on the group offset information of the selected group ID;

select a beamforming weight for data transmission based on the group offset information of the selected group ID;

receive a sounding reference signal (SRS) based on the group offset information of the selected group ID; or any combinations thereof.

16. The NTN device of claim 11, further comprising:

a non-terrestrial wireless transmission platform including the at least one wireless transmitter, wherein the non-terrestrial wireless transmission platform includes at least one of a Geostationary Earth Orbiting (GEO) satellite, a Medium Earth Orbiting (MEO) satellite, a Low Earth Orbiting (LEO) satellite, an Unmanned Aerial System (UAS) vehicle, a High Altitude Platform Station (HAPS) vehicle, a manned aerial vehicle (MAV) device, or any combinations thereof.

17. The NTN device of claim 16, further comprising:

a core network gateway configured to communicate with the non-terrestrial wireless transmission platform, the core network gateway connected to at least one data network, wherein the non-terrestrial wireless transmission platform and the core network gateway operate as a radio access network (RAN) node.

18. The NTN device of claim 11, wherein the at least one processor is further configured to cause the NTN device to:

receive an UL transmission from the at least one UE device;

calculate a UL timing error in the received UL transmission based on the selected group ID;

transmit a group ID re-selection instruction to the at least one UE device based on the calculated UL timing error; and receive a group ID re-selection message from the at least one UE device in response to the transmitted group ID re-selection instruction, the group ID re-selection message including a new group ID selected based on an updated location of the at least one UE device.

19. The NTN device of claim 11, wherein the at least one processor is further configured to cause the NTN device to:

periodically transmit a System Information Block (SIB) message to the beam coverage area, the SIB message including the plurality of group IDs, and the corresponding group offset information.

20. A method of operating a user equipment (UE) device, the method comprising:

determining, using at least one processor, location information of the UE device;

receiving, using the at least one processor, group information from a non-terrestrial network (NTN) device, the group information including a plurality of group identifiers (IDs) corresponding to a plurality group coverage areas within a beam coverage area associated with the NTN device, each of the plurality of group IDs including location information of a corresponding reference point within the corresponding group coverage area, and group offset information associated with the corresponding group coverage area;

selecting, using the at least one processor, a group ID from the plurality of group IDs based on the location information of the UE device and the location information of the plurality of reference points; and performing, using the at least one processor, an uplink (UL) transmission with the NTN device based on the group offset information of the selected group ID.

* * * * *